(12) United States Patent
Fukatani et al.

(10) Patent No.: US 11,299,176 B2
(45) Date of Patent: Apr. 12, 2022

(54) VEHICLE CONTROL DEVICE

(71) Applicant: TOYOTA JIDOSHA KABUSHIKI KAISHA, Toyota (JP)

(72) Inventors: Ryosuke Fukatani, Susono (JP); Nobuhide Kamata, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 223 days.

(21) Appl. No.: 16/674,671

(22) Filed: Nov. 5, 2019

(65) Prior Publication Data
US 2020/0148223 A1 May 14, 2020

(30) Foreign Application Priority Data

Nov. 8, 2018 (JP) .............................. JP2018-210969

(51) Int. Cl.
*B60W 40/103* (2012.01)
*B60W 50/14* (2020.01)
*G05D 1/00* (2006.01)
*B60W 30/18* (2012.01)
*B60W 50/00* (2006.01)

(52) U.S. Cl.
CPC ............ *B60W 50/14* (2013.01); *B60W 30/18* (2013.01); *G05D 1/0088* (2013.01); *B60W 2050/0072* (2013.01); *B60W 2520/105* (2013.01); *B60W 2520/14* (2013.01); *G05D 2201/0213* (2013.01)

(58) Field of Classification Search
CPC .. B60W 50/14; B60W 30/18; B60W 2520/14; B60W 2050/0072; B60W 2520/105; G05D 1/0088; G05D 2201/0213

USPC ............................................................ 701/25
See application file for complete search history.

(56) References Cited

U.S. PATENT DOCUMENTS

| 9,188,985 B1* | 11/2015 | Hobbs ................ G01C 21/3626 |
| 2014/0043473 A1* | 2/2014 | Gupta ....................... G06T 7/80 |
| | | 348/135 |
| 2015/0049193 A1* | 2/2015 | Gupta .................... G03B 43/00 |
| | | 348/148 |

(Continued)

FOREIGN PATENT DOCUMENTS

| JP | 2009-230455 A | 10/2009 |
| JP | 2009230455 A * | 10/2009 |

(Continued)

*Primary Examiner* — Jonathan M Dager
*Assistant Examiner* — Jean W Charleston

(57) ABSTRACT

A vehicle control device controlling a vehicle capable of switching between an automatic driving mode and a driver involvement mode in which a driver is involved includes a blind spot boundary specifying unit configured to specify a boundary of a region becoming a blind spot of the vehicle, a traveling plan generation unit configured to generate a traveling plan in which the vehicle does not collide with a moving body assumed to be positioned on the blind spot boundary specified by the blind spot boundary specifying unit, a determination unit configured to determine whether or not the traveling plan generated by the traveling plan generation unit satisfies a predetermined condition, and a switching unit configured to switch the vehicle from the automatic driving mode to the driver involvement mode when the determination unit determines that the traveling plan satisfies the predetermined condition.

12 Claims, 15 Drawing Sheets

(56) References Cited

U.S. PATENT DOCUMENTS

| | | | | |
|---|---|---|---|---|
| 2015/0166062 A1* | 6/2015 | Johnson | ................ | B60W 10/20 |
| | | | | 701/41 |
| 2015/0291214 A1* | 10/2015 | Mitsumoto | .......... | B62D 5/0457 |
| | | | | 701/41 |
| 2015/0362921 A1* | 12/2015 | Hanaoka | .............. | G05D 1/0274 |
| | | | | 701/23 |
| 2016/0355178 A1* | 12/2016 | Shiraishi | ............ | B62D 15/0285 |
| 2017/0008557 A1* | 1/2017 | Mitsumoto | ............ | B62D 3/126 |
| 2017/0101092 A1* | 4/2017 | Nguyen Van | ......... | G01S 13/723 |
| 2018/0134267 A1* | 5/2018 | Mitsumoto | .......... | B60T 8/17552 |
| 2018/0326995 A1* | 11/2018 | Hiramatsu | .......... | B60W 50/082 |
| 2019/0009794 A1* | 1/2019 | Toyoda | ............... | B60W 50/085 |
| 2019/0023273 A1* | 1/2019 | Ishioka | ................ | B60W 30/10 |
| 2019/0118831 A1* | 4/2019 | Mimura | ................ | B60W 50/16 |
| 2019/0163988 A1* | 5/2019 | Watanabe | ............... | B60R 1/002 |
| 2019/0299980 A1* | 10/2019 | Harai | ................ | B60G 17/0195 |
| 2019/0385456 A1* | 12/2019 | Yoshida | ................ | G01C 21/26 |
| 2020/0317196 A1* | 10/2020 | Yoshida | ................ | B60W 30/10 |

FOREIGN PATENT DOCUMENTS

| | | | |
|---|---|---|---|
| JP | 2010134829 A | 6/2010 | |
| JP | 2011242860 A | 12/2011 | |
| JP | 2016-122308 A | 7/2016 | |
| JP | 2017-162178 A | 9/2017 | |
| JP | 2017206117 A | 11/2017 | |

\* cited by examiner

VEHICLE CONTROL DEVICE

TECHNICAL FIELD

The present disclosure relates to a vehicle control device.

CROSS-REFERENCE TO RELATED APPLICATION

This application claims the benefit of priority from Japanese Patent Application No. 2018-210969, filed Nov. 8, 2019, the entire contents of which are incorporated herein by reference.

BACKGROUND

Vehicle control devices are known in the related art. The vehicle control device that is described in Japanese Unexamined Patent Publication No. 2009-230455 detects a blind spot region where sensors are incapable of detecting a moving body by being blocked by an obstacle such as a wall and a non-host vehicle when a host vehicle has approached an intersection, assumes that a non-host vehicle is present on a blind spot boundary that is the outer edge of the blind spot region, and determines whether or not a collision between the non-host vehicle and the host vehicle is capable of occurring.

More specifically, calculated and compared with respect to a position that is within the detection ranges of the sensors and the host vehicle is capable of reaching within a predetermined time are the time required for the host vehicle to reach the position and the time required for the non-host vehicle assumed to be present on the blind spot boundary to reach the position in the shortest time possible. Then, it is determined that a collision between the non-host vehicle and the host vehicle is capable of occurring when the latter (time required for the non-host vehicle to reach the position in the shortest time possible) is shorter. When it is determined that the collision is capable of occurring, a notification is provided for an occupant by display on a display device being performed to the effect that the collision between the non-host vehicle and the host vehicle is capable of occurring.

SUMMARY

An occupant may feel uncomfortable when an automatic driving vehicle behaves in a way unexpected by the occupant in order to avoid a collision with a non-host vehicle. Accordingly, there is room for further improvement in suppressing an occupant's discomfort.

An object of the present disclosure is to provide a vehicle control device capable of suppressing such discomfort.

A vehicle control device according to the present disclosure is a vehicle control device controlling a vehicle capable of switching between an automatic driving mode and a driver involvement mode in which a driver is involved. The vehicle control device includes a blind spot boundary specifying unit configured to specify a boundary of a region becoming a blind spot of the vehicle, a traveling plan generation unit configured to generate a traveling plan in which the vehicle does not collide with a moving body assumed to be positioned on the blind spot boundary specified by the blind spot boundary specifying unit, a determination unit configured to determine whether or not the traveling plan generated by the traveling plan generation unit satisfies a predetermined condition, and a switching unit configured to switch the vehicle from the automatic driving mode to the driver involvement mode when the determination unit determines that the traveling plan satisfies the predetermined condition.

In this vehicle control device, the automatic driving mode in which the driver is not involved does not continue and switching to the driver involvement mode in which the driver is involved is performed when the traveling plan planned such that a collision with the moving body assumed to be positioned in the blind spot is avoided is likely to cause an occupant's discomfort. Accordingly, it is possible to perform control in which the occupant's discomfort is suppressed while ensuring safety by preventing a collision by the specification of the blind spot. Here, "occupant" refers to a person in the vehicle, includes a person driving the vehicle in the vehicle, and includes a person not driving the vehicle in the vehicle. "Driver" includes a person driving the vehicle in the vehicle and includes a remote operator (so-called operator) remotely operating the vehicle from a remote place (so-called operation center). "Automatic driving mode" is a mode in which the driver is not involved in traveling of the vehicle. "Operator involvement mode" includes a mode in which a person driving the vehicle in the vehicle drives the vehicle as a driver and a mode in which a remote operator remotely operates the vehicle as a driver.

In the vehicle control device according to the present disclosure, the predetermined condition may be at least one of a speed, an acceleration, and a yaw rate in the traveling plan generated by the traveling plan generation unit being equal to or greater than a predetermined threshold. With such a configuration, it is possible to determine that the occupant's discomfort is likely to be caused when at least one of the speed, the acceleration, and the yaw rate in the generated traveling plan exceeds a predetermined value, and thus the occupant's discomfort can be further suppressed and the above effect of the present disclosure becomes remarkable.

The vehicle control device according to the present disclosure may further include a notification unit configured to notify the driver that the vehicle is switched from the automatic driving mode to the driver involvement mode before the switching unit switches the vehicle from the automatic driving mode to the driver involvement mode when the determination unit determines that the traveling plan satisfies the predetermined condition. With such a configuration, the driver is notified prior to driving mode switching when the occupant's discomfort is likely to be caused, and thus the driver can appropriately prepare to take over the driving operation. Accordingly, it is possible to further improve convenience while performing control in which the occupant's discomfort is suppressed.

In the vehicle control device according to the present disclosure, a determination position where the determination unit makes a determination may include a first determination position and a second determination position positioned farther in front of the vehicle than the first determination position and free from a collision with the assumed moving body and the determination unit may be configured to re-determine whether or not the traveling plan satisfies the predetermined condition at the second determination position after determining whether or not the traveling plan satisfies the predetermined condition at the first determination position. With such a configuration, it is possible to, for instance, re-determine whether or not the traveling plan satisfies the predetermined condition by moving to the position of further forward movement (second determination position) after temporarily stopping in front of an intersection (first determination position) and making a determination. Accordingly, it is possible to determine at the second determination position that switching to the driver involvement mode is unnecessary, that is, the automatic driving mode can be continued even when it is determined at the first determination position that the switching is necessary. In other words, it is possible to suppress unnecessary switching to the driver involvement mode as compared with a case where such a configuration is not provided, and thus it is possible to further improve convenience while performing control in which the occupant's discomfort is suppressed.

The vehicle control device according to the present disclosure may further include a map database and a road type determination unit configured to determine, based on the map database, whether or not a lane in which the vehicle travels is a priority road with respect to a lane in which the assumed moving body travels. The traveling plan generation unit may be configured to generate a traveling plan on an assumption that the assumed moving body is traveling when the road type determination unit determines that the lane in which the vehicle travels is the priority road and generate a traveling plan on an assumption that the assumed moving body is stopping when the road type determination unit determines that the lane in which the vehicle travels is not the priority road. With such a configuration, a determination is made in accordance with whether or not the road on which the host vehicle travels is the priority road, and thus unnecessary switching to the driver involvement mode can be suppressed. Accordingly, it is possible to further improve convenience while performing control in which the occupant's discomfort is suppressed.

In the vehicle control device according to the present disclosure, the type of the assumed moving body may be set based on a blind spot area estimated from the map database and the blind spot specified by the blind spot boundary specifying unit. With such a configuration, the assumed moving body can be set based on the blind spot area (for instance, a vehicle can be set when the blind spot area is large and a pedestrian can be set when the blind spot area is small), and thus it is possible to make a more appropriate determination on whether or not to switch the driving mode and it is possible to suppress unnecessary switching to the driver involvement mode. Accordingly, it is possible to further improve convenience while performing control in which the occupant's discomfort is suppressed.

According to the present disclosure, it is possible to provide a vehicle control device capable of performing automatic driving control in which an occupant's discomfort is suppressed.

DETAILED DESCRIPTION

Figure 1:
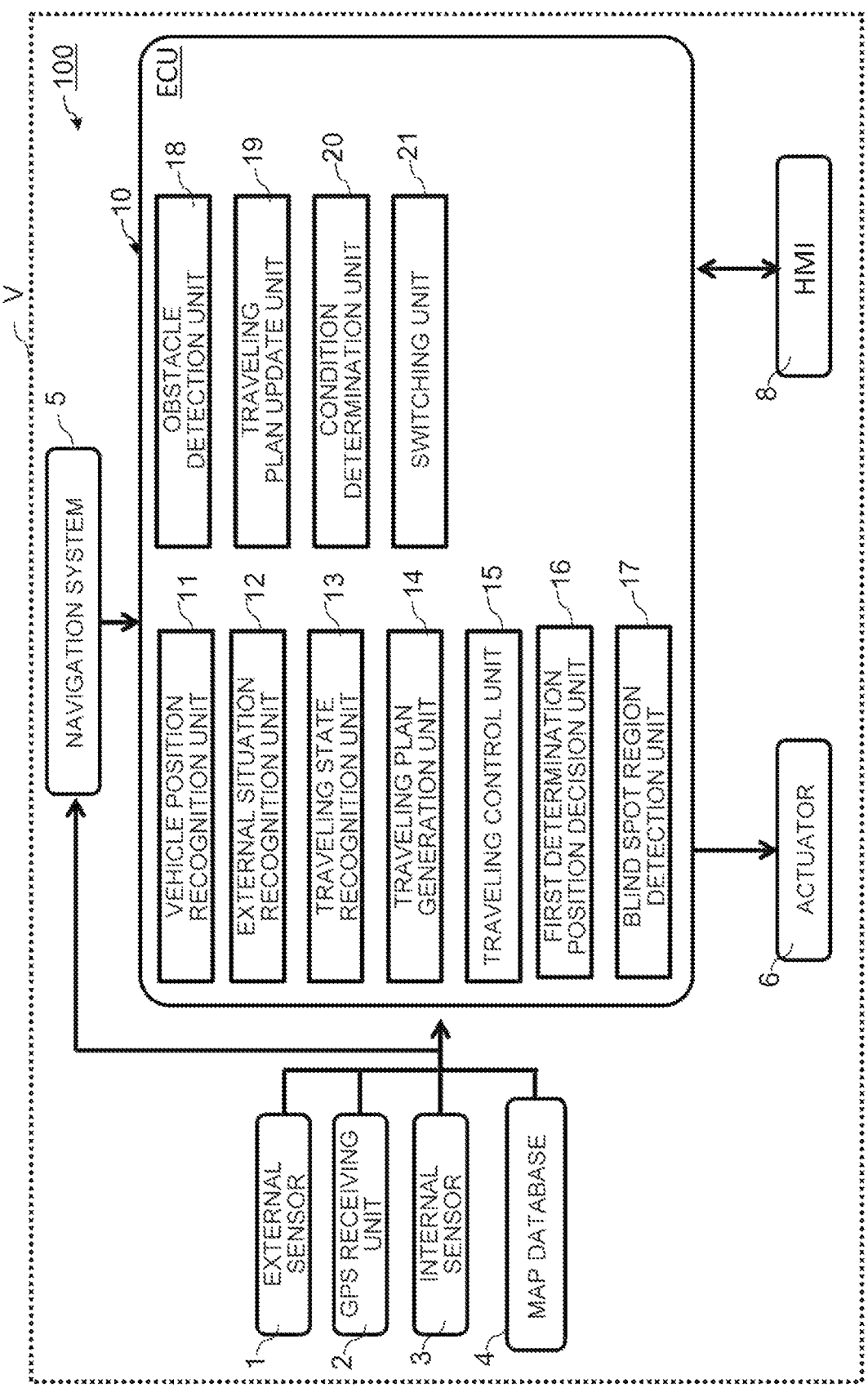
FIG. 1 is a block diagram illustrating the configuration of a vehicle control device according to a first embodiment.

Hereinafter, embodiments of the present disclosure will be described in detail with reference to the drawings. In the following description, the same reference numerals are used for the same or corresponding elements and the same description will not be repeated.

First Embodiment

FIG. 1 is a block diagram illustrating the configuration of a vehicle control device 100 according to a first embodiment. As illustrated in FIG. 1, the vehicle control device 100 is mounted in a vehicle V such as an automobile. The vehicle control device 100 is provided with an external sensor (surrounding information detection unit) 1, a global positioning system [GPS] receiving unit 2, an internal sensor 3, a map database 4, a navigation system 5, an actuator 6, a human machine interface [HMI] (notification unit) 7, and an electronic control unit [ECU] 10.

The external sensor 1 is a detection device detecting an external situation that is surrounding information related to the vehicle V. The external sensor 1 includes at least one of a camera, a radar sensor, and a laser imaging detection and ranging [LIDAR] sensor. The camera is an imaging device imaging the external situation related to the vehicle V.

The camera is provided on, for instance, the back side of the windshield of the vehicle V. The camera transmits imaging information related to the external situation regarding the vehicle V to the ECU 10. The camera may be a monocular camera or may be a stereo camera.

The radar sensor detects obstacles outside the vehicle V by using radio waves (such as millimeter waves). The radar sensor detects the obstacles by transmitting the radio waves to the surroundings of the vehicle V and receiving the radio waves reflected by the obstacles. The radar sensor transmits detected obstacle information to the ECU 10. The LIDAR sensor detects obstacles outside the vehicle V by using light. The LIDAR sensor detects the obstacles by measuring the distances to reflection points by transmitting the light to the surroundings of the vehicle V and receiving the light reflected by the obstacles. The LIDAR sensor transmits detected obstacle information to the ECU 10. The camera, the LIDAR sensor, and the radar sensor do not necessarily have to be provided in a duplicated manner.

The GPS receiving unit 2 measures the position of the vehicle V (such as the latitude and the longitude of the vehicle V) by receiving signals from three or more GPS satellites. The GPS receiving unit 2 transmits information on the measured position of the vehicle V to the ECU 10. Other means capable of specifying the latitude and the longitude of the vehicle V may be used in place of the GPS receiving unit 2. In addition, providing the function of measuring the orientation of the vehicle V is preferable for collation between map information (described later) and a sensor measurement result.

The internal sensor 3 is a detection device detecting the traveling state of the vehicle V. The internal sensor 3 includes at least one of a vehicle speed sensor, an acceleration sensor, and a yaw rate sensor. The vehicle speed sensor is a detector that detects the speed of the vehicle V. A vehicle wheel speed sensor that is provided with respect to, for instance, at least one of a vehicle wheel of the vehicle V and a drive shaft rotating integrally with the vehicle wheel and detects the rotation speed of the vehicle wheel is used as an instance of the vehicle speed sensor. The vehicle speed sensor transmits detected vehicle speed information (vehicle wheel speed information) to the ECU 10.

The acceleration sensor is a detector that detects the acceleration of the vehicle V. The acceleration sensor includes, for instance, a longitudinal acceleration sensor detecting the acceleration of the vehicle V in a longitudinal direction and a lateral acceleration sensor detecting the lateral acceleration of the vehicle V. The acceleration sensor transmits, for instance, acceleration information regarding the vehicle V to the ECU 10. The yaw rate sensor is a detector that detects the yaw rate (rotational angular velocity) around the vertical axis of the center of gravity of the vehicle V. A gyro sensor or the like can be used as the yaw rate sensor. The yaw rate sensor transmits detected yaw rate information regarding the vehicle V to the ECU 10.

The map database 4 is a database provided with the map information. The map database is formed in, for instance, a hard disk drive [HDD] mounted in the vehicle. The map information includes, for instance, road position information, road shape information (such as curves, straight section types, and curve curvatures), intersection position information, and branch point position information. Further, it is preferable that the map information includes an output signal of the external sensor 1 (the output signal may be processed information) so that position information on shielding structures such as buildings and walls and the simultaneous localization and mapping [SLAM] technology are used. The map database may be stored in a computer in a facility such as an information processing center capable of communicating with the vehicle V. Further, the map database 4 may include legal speed limit information that is information related to the legal speed limits of the road on which the host vehicle travels and a road intersecting with the road.

The navigation system 5 is a device that guides at least one of the driver and an occupant of the vehicle V to a destination set by at least one of the driver and the occupant of the vehicle V. The navigation system 5 calculates the traveling route of the vehicle V based on the information on the position of the vehicle V measured by the GPS receiving unit 2 and the map information in the map database 4. The route may specify a preferred lane in a section having a plurality of lanes. For instance, the navigation system 5 calculates a target route from the position of the vehicle V to the destination and notifies at least one of the driver and the occupant of the target route by display and voice output from a speaker. For instance, the navigation system 5 transmits information on the target route of the vehicle V to the ECU 10. The navigation system 5 may be stored in a computer in a facility such as an information processing center capable of communicating with the vehicle V.

The actuator 6 is a device that executes traveling control for the vehicle V. The actuator 6 includes at least a throttle actuator, a brake actuator, and a steering actuator. When the vehicle V is at least one of a hybrid vehicle and an electric vehicle, the throttle actuator is not included and the drive force is controlled by a control signal from the ECU 10 being input to a motor as a power source.

The brake actuator controls a brake system in accordance with a control signal from the ECU 10 and controls a braking force given to the vehicle wheel of the vehicle V. As a result, the steering actuator controls the steering torque of the vehicle V.

The HMI 7 is an interface for outputting and inputting information between at least one of the driver and the occupant of the vehicle V and the vehicle control device 100. The HMI 7 includes, for instance, a display panel for displaying image information to at least one of the driver and the occupant, a speaker for voice output, and at least one of an operation button and a touch panel for at least one of the driver and the occupant to perform an input operation. When a condition determination unit 20 determines that a traveling plan is likely to cause the occupant's discomfort, the HMI 7 provides a notification for the driver to the effect that the driving mode is switched from an automatic driving mode to a driver involvement mode in a predetermined time. In other words, the HMI 7 provides a notification for the driver to the effect that the driver is required to perform a driving operation at least in part in a predetermined time. The specific content of the notification is not limited to the driver being required to perform the entire driving operation in a predetermined time and the content may be, for instance, requesting the driver to put his or her foot on the brake pedal in a predetermined time. The HMI 7 may be provided in a dedicated manner for these notifications to be provided. The HMI 7 may additionally have, for instance, a function that allows at least one of the driver and the occupant to set a destination with the navigation system 5 and perform an input operation for automatic traveling activation or may additionally have the function of notifying at least one of the driver and the occupant of arrival at the destination when the destination is reached. When it is intended that the driver resumes the automatic driving mode after the automatic driving mode is switched to the driver involvement mode, the HMI 7 may have the function of performing an input operation related to the intention.

As illustrated in FIG. 1, the ECU 10 controls the automatic traveling of the vehicle V. The ECU 10 is an electronic control unit having a central processing unit [CPU], a read only memory [ROM], a random access memory [RAM], and so on. The ECU 10 executes various types of control by loading a program stored in the ROM into the RAM and executing the program with the CPU. A plurality of electronic control units may constitute the ECU 10.

The ECU 10 has a vehicle position recognition unit 11, an external situation recognition unit 12, a traveling state recognition unit 13, a traveling plan generation unit 14, a traveling control unit 15, a first determination position decision unit 16, a blind spot region detection unit 17 (blind spot boundary specifying unit), an obstacle detection unit 18, a moving body movement time calculation unit 20, the condition determination unit 20, and a switching unit 21.

The vehicle position recognition unit 11 recognizes the position of the vehicle V on a map (hereinafter, referred to as "vehicle position") based on the information on the position of the vehicle V received by the GPS receiving unit 2 and the map information in the map database 4. The vehicle position recognition unit 11 may acquire and recognize the vehicle position used in the navigation system 5 from the navigation system 5. When the vehicle position of the vehicle V can be measured by an externally installed sensor such as an on-road sensor, the vehicle position recognition unit 11 may acquire the vehicle position from the sensor by communication.

The external situation recognition unit 12 recognizes the external situation regarding the vehicle V based on the detection result of the external sensor 1 (such as the imaging information of the camera, the obstacle information of the radar sensor, and the obstacle information of the LIDAR sensor). The external situation includes, for instance, at least one of the position of the white line of the lane of traveling and the position of the center of the lane with respect to the vehicle V, a road width, a road shape (such as the curvature of the traveling lane, a change in road surface gradient effective for light-of-sight estimation by the external sensor 1, and undulation), and the situations of obstacles around the vehicle V (such as information for distinguishing between fixed and moving obstacles, the positions of the obstacles with respect to the vehicle V, the directions in which the obstacles move with respect to the vehicle V, and the relative speeds of the obstacles with respect to the vehicle V). It is preferable to supplement the accuracy of the position and the direction of the vehicle V acquired by the GPS receiving unit 2 or the like by collating the detection result of the external sensor 1 and the map information with each other.

The traveling state recognition unit 13 recognizes the traveling state of the vehicle V based on the detection result of the internal sensor 3 (such as the vehicle speed information of the vehicle speed sensor, the acceleration information of the acceleration sensor, and the yaw rate information of the yaw rate sensor). The traveling state of the vehicle V includes, for instance, the speed, the acceleration, and the yaw rate of the vehicle.

The traveling plan generation unit 14 generates a course for the vehicle V based on, for instance, the target route calculated by the navigation system 5, the vehicle position recognized by the vehicle position recognition unit 11, and the external situation regarding the vehicle V recognized by the external situation recognition unit 12 (including the position and the orientation of the vehicle). The course is the trajectory of the vehicle V on the target route. The traveling plan generation unit 14 generates the course such that the vehicle V appropriately travels on the target route in accordance with standards such as safety, legal compliance, and traveling efficiency. It is a matter of course that the traveling plan generation unit 14 at this time generates the course of the vehicle V based on the situations of the obstacles around the vehicle V such that contact with the obstacles is avoided. The target route mentioned here includes a traveling route that is automatically generated based on at least one of the external situation and the map information when no destination is explicitly set by at least one of the driver and the occupant.

The traveling plan generation unit 14 generates a traveling plan in accordance with the generated course. In other words, the traveling plan generation unit 14 generates a traveling plan along the preset target route based at least on the external situation that is the surrounding information related to the vehicle V and the map information in the map database 4.

The traveling plan may be data indicating how the speed, the acceleration and deceleration, the steering torque, and so on of the vehicle V change when the vehicle V travels on the course along the target route. The traveling plan may include the speed pattern, the acceleration and deceleration pattern, and the steering pattern of the vehicle V. Here, the traveling plan generation unit 14 may generate the traveling plan such that the time of travel (time required until the vehicle V arrives at the destination) is minimized. In addition, the traveling plan includes a plan generated based on a traveling route set before traveling initiation and a traveling plan generated based on dynamic factors acting during traveling such as the detection result of the external situation recognition unit 12. Also, a past traveling plan is updated with the traveling plan generated based on the dynamic factors acting during traveling.

The speed pattern is, for instance, data including a target vehicle speed set in association with time and for each target control position with respect to the target control positions set at a predetermined interval (such as 1 m) on the course. The acceleration and deceleration pattern is, for instance, data including a target acceleration and deceleration set in association with time and for each target control position with respect to the target control positions set at a predetermined interval (such as 1 m) on the course. The steering pattern is, for instance, data including a target steering torque set in association with time and for each target control position with respect to the target control positions set at a predetermined interval (such as 1 m) on the course.

The traveling control unit 15 automatically controls the traveling of the vehicle V based on the traveling plan generated by the traveling plan generation unit 14. The traveling control unit 15 outputs a control signal corresponding to the traveling plan to the actuator 6. As a result, the traveling control unit 15 controls the traveling of the vehicle V such that the vehicle V automatically travels along the traveling plan.

Figure 2:
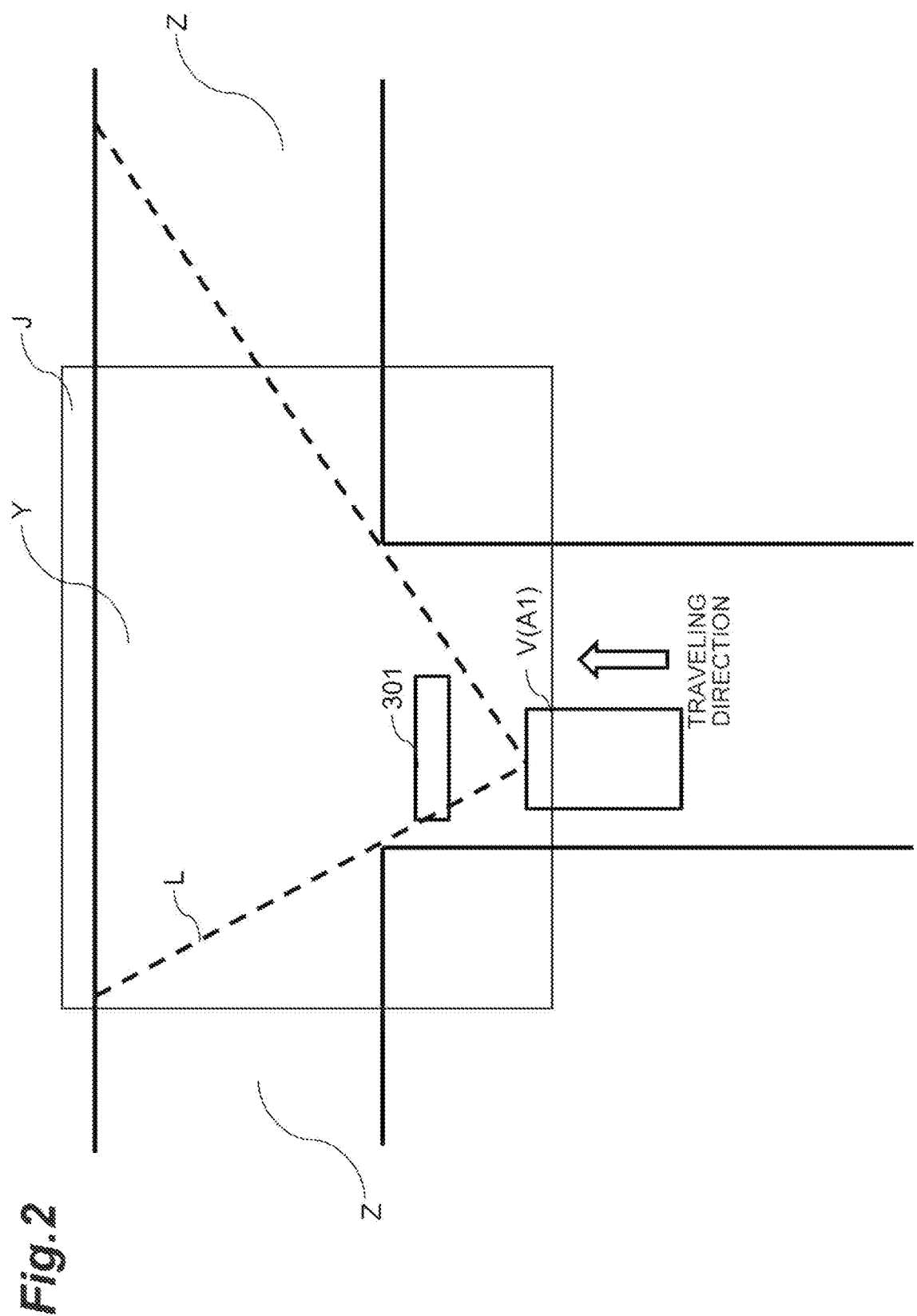
FIG. 2 is a diagram illustrating a state where a vehicle is stopped at a first determination position.

The first determination position decision unit 16 decides the position where blind spot determination (described later) is performed first (hereinafter, referred to as the first determination position A1) when the vehicle V has approached a blind spot determination region J. The first determination position A1 is set as a position where at least one of a surrounding vehicle and a pedestrian feels no discomfort even when the vehicle V stops, that is, a position where the vehicle is expected to stop. For instance, the first determination position A1 can be a position in front of a temporary stop line near an intersection in the traveling direction of the vehicle V. The first determination position A1 may be decided not only when the vehicle V has approached the blind spot determination region J but also after the vehicle V has entered the blind spot determination region J. Here, the blind spot determination region J can be a region determined in advance in the map database 4 so that the blind spot determination according to the present disclosure is performed. In addition, the blind spot determination region J may be at least one of a rectangular region and a circular region surrounding the periphery of an intersection at a predetermined distance in the information on the intersection that is stored in the map database 4. FIG. 2 schematically illustrates a state where the vehicle V is positioned at the first determination position A1. The first determination position A1 may be determined by a temporary stop position stored in advance in the map database 4 being acquired or the external sensor 1 detecting or recognizing a temporary stop line 301 on a road surface.

The blind spot region specifying unit 17 (blind spot boundary specifying unit) specifies a region becoming a blind spot of the vehicle V (hereinafter, referred to as the blind spot region) based on information acquired from the external sensor 1. A known technique (such as Japanese Unexamined Patent Publication No. 2009-230455) can be used as a method for the specification.

Hereinafter, the content of the above-mentioned known technique will be described with reference to FIG. 2. When the vehicle V travels while the distance between the vehicle V and an object around the vehicle V is measured by the external sensor 1, the distance drastically increases in a place. Specifically, the difference between two consecutive measurement results may exceed a certain threshold when the two consecutive measurement results are compared and a certain threshold may exceed the difference between the next two consecutive measurement results when the next two consecutive measurement results are compared. At this time, it can be estimated that a boundary becoming a blind spot is present in the direction in which the second measurement was performed among the three consecutive measurement results. In FIG. 2, the blind spot region specifying unit 17 specifies a blind spot boundary L. The blind spot boundary L partitions a visible region Y and a blind spot region Z from each other. In the following description, the ratio of the visible region in the region where the vehicle V can be detected will be referred to as "visible region ratio". Although the blind spot region specifying unit 17 specifies the blind spot region after the first determination position decision unit 16 decides the first determination position in the above description, the first determination position decision unit 16 may decide a position where the visible region ratio is below a predetermined ratio during the traveling of the vehicle V as the first determination position with the blind spot specification by the blind spot region specifying unit 17 performed at all times.

The obstacle detection unit 18 detects the presence of an obstacle from the visible region Y specified by the blind spot region specifying unit 17 based on the detection result of the external sensor 1. At this time, simply the presence and the size of the obstacle may be detected from the input of the external sensor 1 or the type of the obstacle (such as a wall, a vehicle, and a pedestrian) may be recognized by comparison and classification being performed with appropriate teacher data or the like or the direction of movement and the speed of movement of the obstacle being detected.

Figure 3:
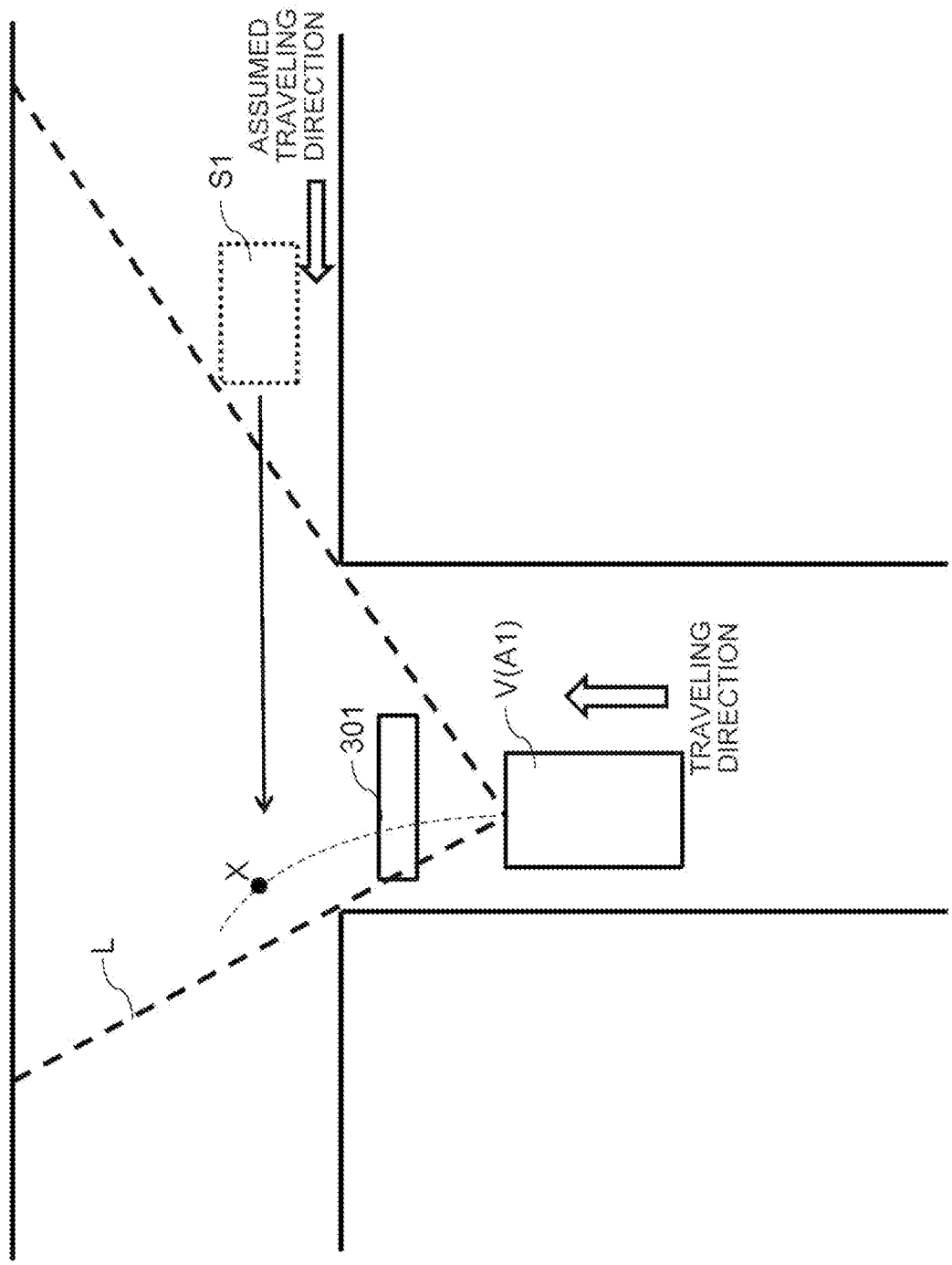
FIG. 3 is a diagram illustrating the position of a moving body assumed by the vehicle control device.

A traveling plan update unit 19 assumes that a moving body is present on the blind spot boundary specified by the blind spot region specifying unit 17 and updates the traveling plan generated by the traveling plan generation unit 14 based on a behavior of the assumed moving body. Specifically, in FIG. 3, it is assumed that a traveling vehicle S1 is present on the blind spot boundary L. The time until the vehicle V reaches a predetermined position X on a course R included in the traveling plan at a predetermined speed and the time until the assumed vehicle S1 reaches the predetermined position X at a predetermined speed are compared. The traveling plan update unit 19 updates the traveling plan generated by the traveling plan generation unit 14 (pre-update traveling plan) by creating a new traveling plan in which a collision between the vehicle V and the assumed vehicle S1 can be avoided based on the result of the comparison. Here, the predetermined speed of the vehicle V can be a slow speed (such as 10 km/h or less). The predetermined speed of the assumed vehicle S1 may be in the form of the legal speed limit information stored in the map database 4 (such as 60 km/h). In addition, the predetermined speed of the assumed vehicle S1 may be in the form of a value obtained by any speed being added to the legal speed limit information (such as 70 km/h and 80 km/h). In addition, the predetermined speed of the assumed vehicle S1 may be in the form of a maximum speed taking into account a speed limiter mounted in an ordinary automobile (such as 180 km/h).

The condition determination unit 20 determines whether or not the new traveling plan updated by the traveling plan update unit 19 satisfies a predetermined condition, that is, whether or not the updated traveling plan is likely to cause the occupant's discomfort. Here, the predetermined condition may be at least one of the speed, the acceleration, and the yaw rate in the new traveling plan generated by the traveling plan update unit 19 being equal to or greater than a predetermined threshold. In other words, when the new traveling plan updated by the traveling plan update unit 19 satisfies the predetermined condition, it is determined that the updated traveling plan is likely to cause the occupant's discomfort. The occupant's discomfort is likely to be caused when the new traveling plan generated by the traveling plan update unit 19 includes a place of speed, acceleration, or yaw rate equal to or greater than a predetermined threshold. Here, the predetermined threshold may be empirically determined as a value at which the occupant's discomfort is likely to be caused. The predetermined threshold may be fixed or vary with at least one of the vehicle speed information and the vehicle position information.

The switching unit 21 switches between the automatic driving mode and the driver involvement mode in which the driver is involved based on the determination of the condition determination unit 20. Here, the automatic driving mode is a mode in which the traveling control unit 15 performs every control necessary for the traveling of the vehicle. In the driver involvement mode, the driver performs the control necessary for the traveling of the vehicle in whole or in part. As an instance, in the driver involvement mode, the driver performs at least one of steering, accelerator, and brake operations.

Next, the processing that is executed by the vehicle control device 100 will be described in detail with reference to the flowchart in FIG. 4.

Figure 4:
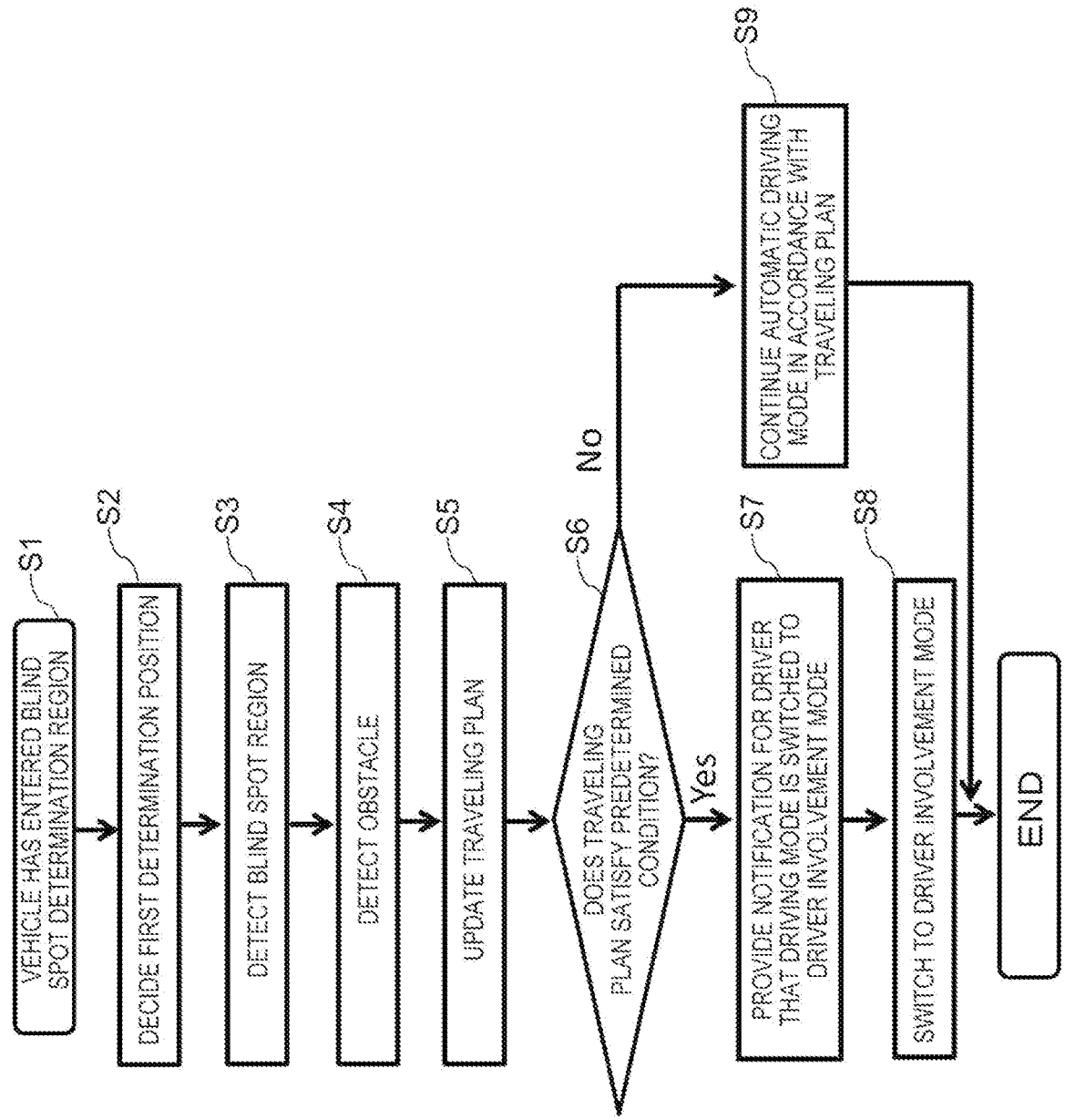
FIG. 4 is a flowchart illustrating the processing that is performed by the vehicle control device according to the first embodiment.

FIG. 4 is a flowchart illustrating the automatic traveling processing of the vehicle control device 100. The vehicle V initiates traveling in the automatic driving mode in accordance with the traveling plan generated by the traveling plan generation unit 14 when, for instance, at least one of the driver and the occupant of the vehicle V sets a destination with the navigation system 5 and performs an input operation for activating or allowing automatic traveling on the HMI 7 in the vehicle control device 100. Subsequently, the ECU 10 executes the following flowchart when the vehicle V has approached or entered the blind spot determination region J (S1).

In S2, the first determination position decision unit 16 decides the first determination position. After the vehicle V is positioned at the first determination position, the blind spot region specifying unit 17 specifies the blind spot region of the vehicle V in S3 based on information related to the distance acquired by the external sensor 1. Next, in S4, the obstacle detection unit 18 detects the presence of an obstacle in the visible region based on the detection result of the external sensor 1. Next, in S5, the traveling plan update unit 19 assumes that a moving body (assumed vehicle S1) is present at each position on the boundary specified by the blind spot region specifying unit 17 and updates the traveling plan generated by the traveling plan generation unit 14 based on a behavior of the assumed moving body (described above). A legal speed limit may be used as a predetermined speed as described above and another decision method may also be used.

Next, in S6, the condition determination unit 20 determines whether or not the traveling plan generated by the traveling plan update unit 19 satisfies a predetermined condition. In other words, the condition determination unit 20 determines whether or not the traveling plan is likely to cause the occupant's discomfort. When the condition determination unit 20 determines that the traveling plan satisfies the predetermined condition, that is, the traveling plan is likely to cause the occupant's discomfort, the HMI 7 provides a notification for the driver to the effect that the driving mode is switched from the automatic driving mode to the driver involvement mode in a predetermined time (S7). In other words, the HMI 7 provides a notification to the effect that the driver is required to perform a driving operation at least in part in a predetermined time. Next, the switching unit 21 switches the driving mode and the automatic driving mode is switched to the driver involvement mode (S8).

When the condition determination unit 20 determines that the traveling plan does not satisfy the predetermined condition, the traveling control unit 15 controls the vehicle in accordance with the updated traveling plan (S9). In other words, when the condition determination unit 20 determines that the traveling plan is unlikely to cause the occupant's discomfort, the switching unit 21 does not switch the driving mode and the automatic driving mode is continued.

As described above, in the vehicle control device 100 of the present embodiment, a traveling plan to avoid a collision with a moving body assumed to be positioned in the blind spot is generated when the vehicle in the automatic driving mode approaches or enters the blind spot region and a notification requesting driver involvement is provided when the traveling plan is likely to cause the occupant's discomfort. In other words, the driver is involved before the traveling plan likely to cause the occupant's discomfort is executed. Accordingly, it is possible to suppress the occupant feeling discomfort by control unexpected by the occupant being performed.

The automatic driving mode continues when it is determined that the traveling plan to avoid the collision with the moving body is unlikely to cause the occupant's discomfort, and thus it is possible to reduce the bother of requesting driver involvement by unnecessarily switching the automatic driving mode.

Second Embodiment

Next, a second embodiment will be described. In the description of the present embodiment, differences from the first embodiment will be described.

Figure 5:
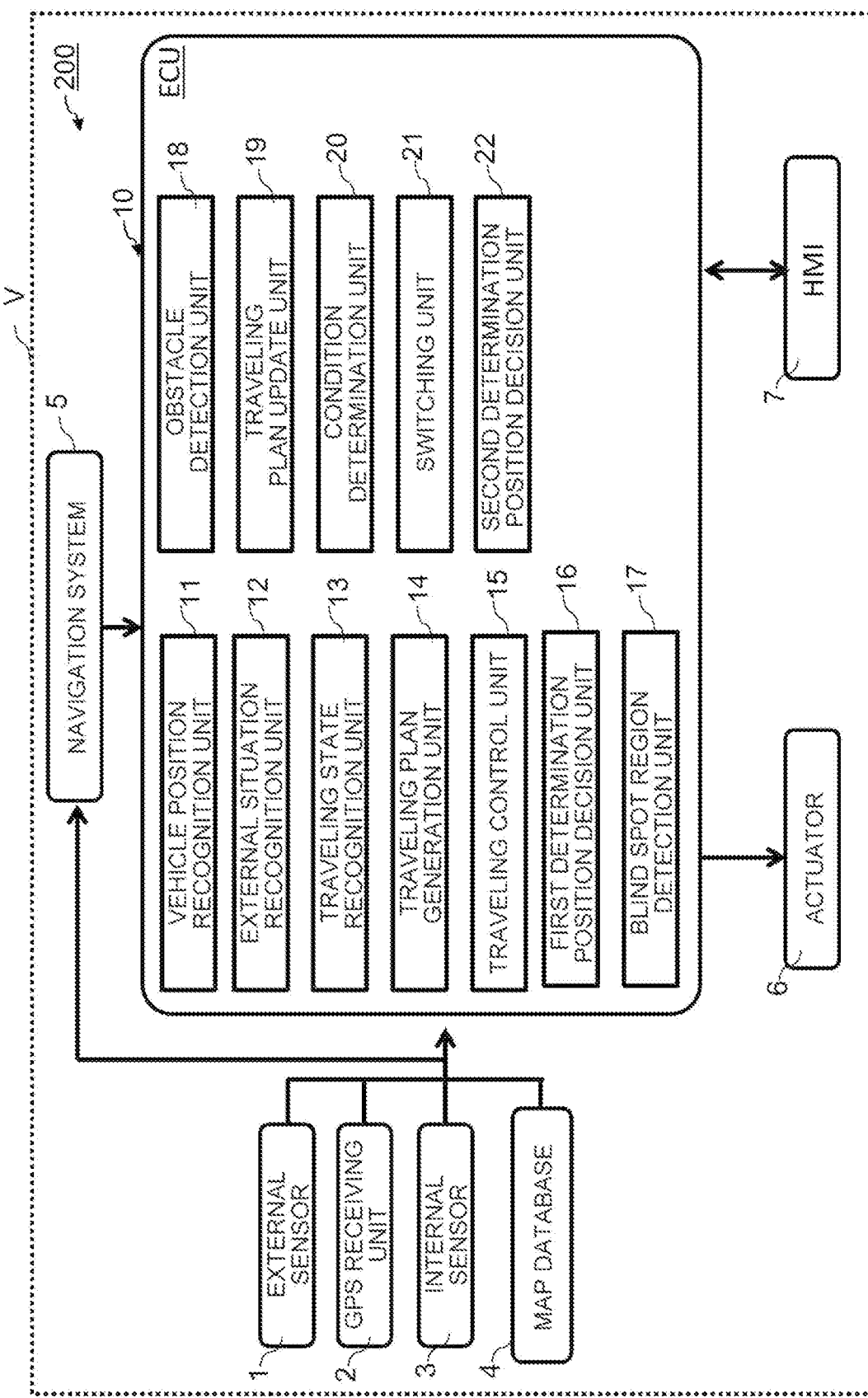
FIG. 5 is a block diagram illustrating an ECU of a vehicle control device according to a second embodiment.

FIG. 5 is a block diagram illustrating the ECU 10 in a vehicle control device 200 according to the second embodiment. As illustrated in FIG. 5, the vehicle control device 200 of the present embodiment is different from the first embodiment in that the vehicle control device 200 is provided with a second determination position decision unit 22.

Figure 6:
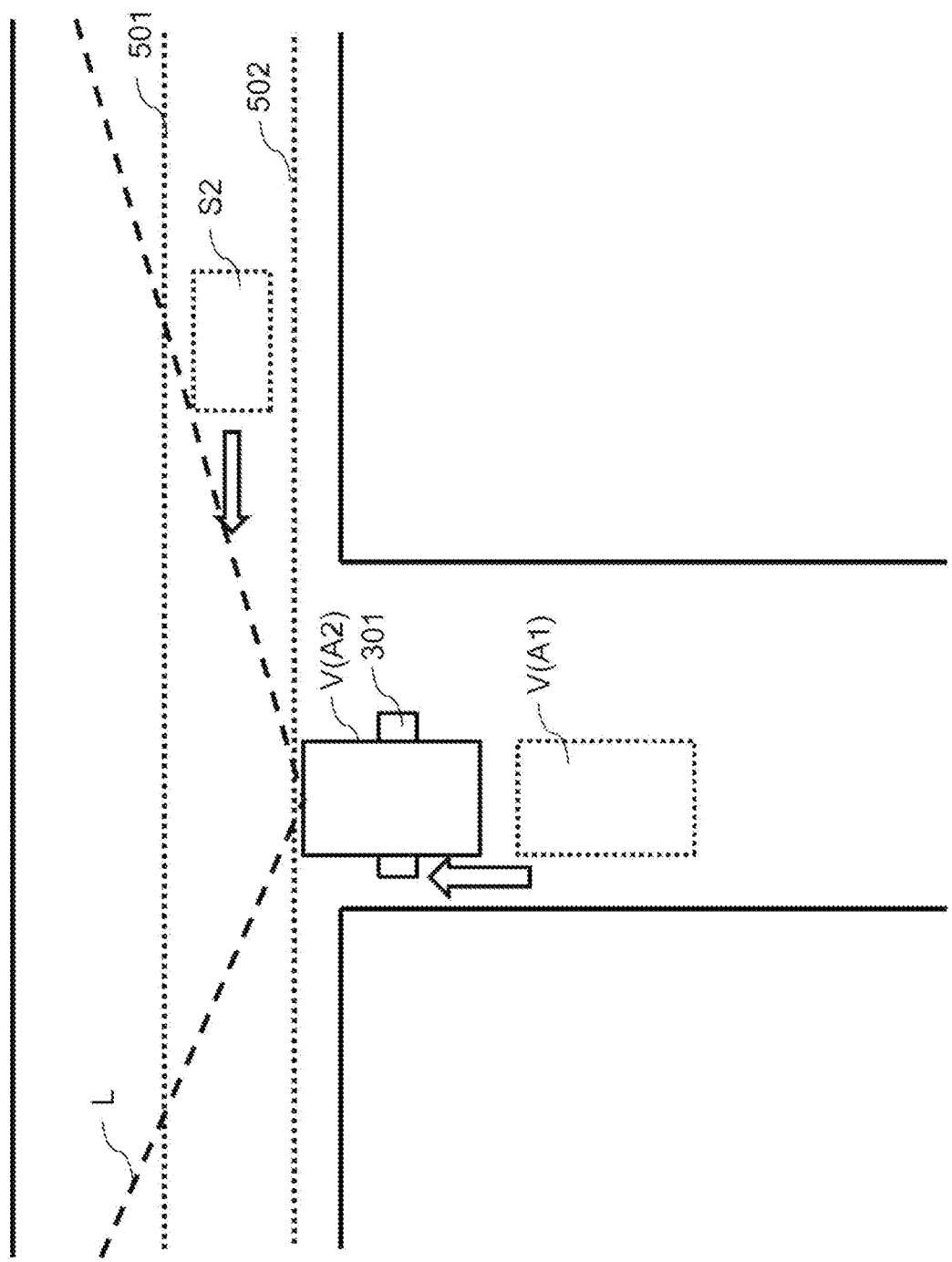
FIG. 6 is a diagram illustrating a state where the vehicle is stopped at a second determination position.

The second determination position decision unit 22 decides a second determination position where the vehicle that has moved forward from the first determination position performs the blind spot determination again. The second determination position is a position farther in front of the vehicle V than the first determination position and is a position where at least one of a surrounding pedestrian and the occupant of the vehicle feels no discomfort even when the vehicle stops. For instance, the second determination position is a position farther in front of the vehicle V than the first determination position and is a position where the moving body assumed by the traveling plan update unit 19 and the vehicle V do not come into contact with each other. The "position where the assumed moving body and the vehicle V do not come into contact with each other" can be a position where the vehicle V stopped at the first determination position in front of the intersection has moved forward and the vehicle V does not enter the traveling lane of the assumed moving body (such as a vehicle). In addition, the "position where the assumed moving body and the vehicle V do not come into contact with each other" can be a position where a part of the vehicle V has entered the traveling lane of the assumed moving body and the assumed moving body does not come into contact with the vehicle V when the assumed moving body is assumed to travel in the middle of the lane. FIG. 6 illustrates the vehicle V that has moved forward from the first determination position A1 and stopped at a second determination position A2.

Figure 7:
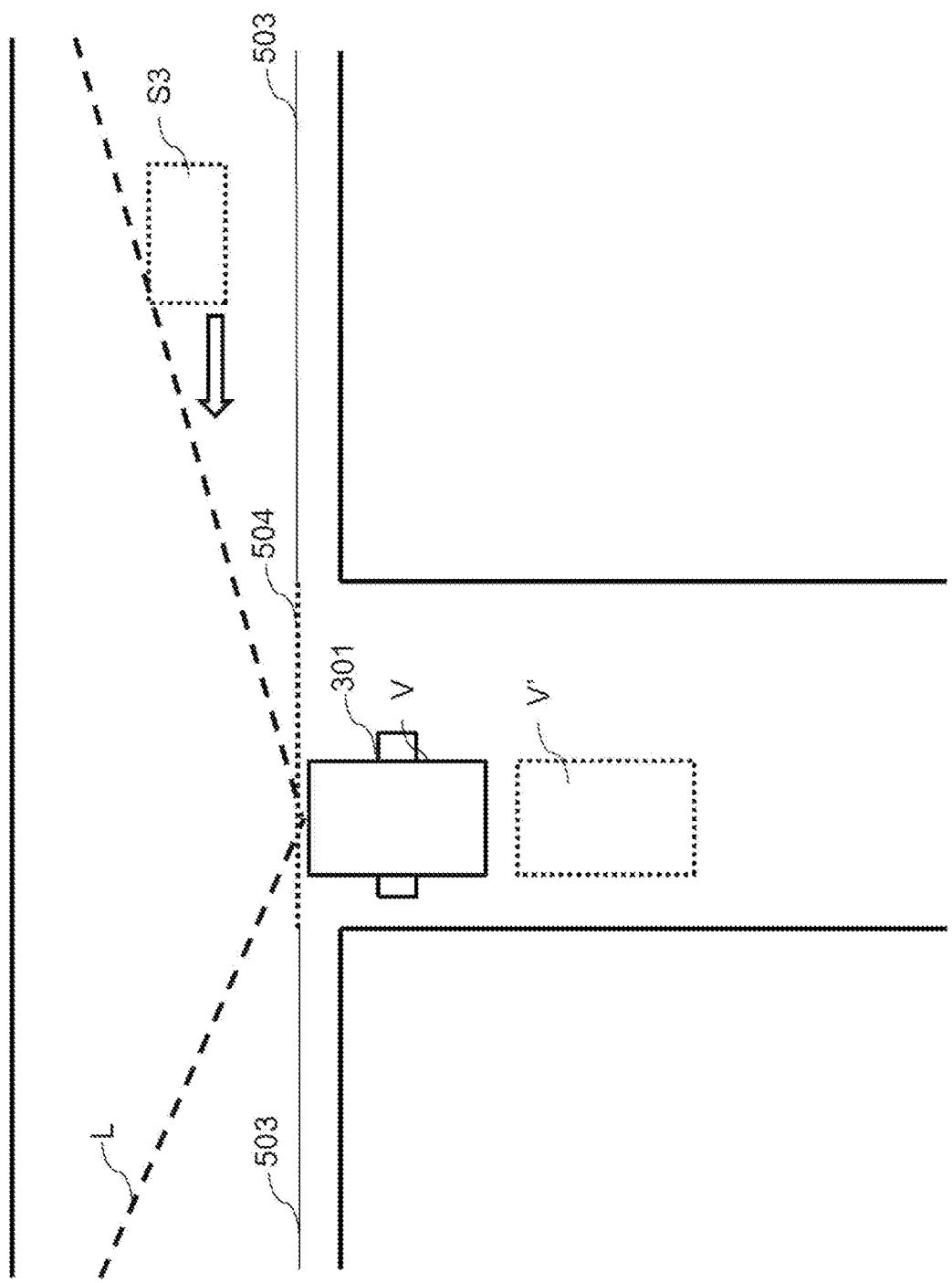
FIG. 7 is a diagram illustrating the state where the vehicle is stopped at the second determination position.

The second determination position A2 may be decided by the second determination position decision unit 22 performing reading from the map information stored in the map database 4 or by the external sensor 1 performing road structure detection. Specifically, a centerline 501 of a lane (traveling lane of an assumed vehicle S2) intersecting with the traveling lane of the vehicle V may be decided, an imaginary line 502 extending in parallel with the centerline 501 at a predetermined distance from the centerline 501 may be calculated, and the vehicle V may travel in the middle of the width between the centerline 501 and the imaginary line 502 as illustrated in, for instance, FIG. 6. In this case, the position of the vehicle V at a time when the vehicle V has moved forward from the first determination position A1 to the place of the imaginary line 502 is the second determination position A2. Alternatively, the second determination position A2 may be determined by a white line 503, which extends in parallel to the lane (traveling lane of the assumed vehicle S2) intersecting with the traveling lane of the vehicle V, being detected as illustrated in FIG. 7. In this case, the position where the vehicle V has moved forward from the first determination position A1 to the white line 503 is the second determination position A2. Further, when the white line 503 is broken, the second determination position A2 may be determined by an imaginary line 504 connecting the broken lines being set. In this case, the position where the vehicle V has moved forward from the first determination position A1 to the imaginary line 504 is the second determination position A2.

At the second determination position A2, the blind spot region specifying unit 17 specifies the blind spot region and the traveling plan update unit 19 updates the traveling plan on the assumption that a moving body is present on the blind spot boundary specified by the blind spot region specifying unit 17. Further, the condition determination unit 20 determines whether or not the new traveling plan updated by the traveling plan update unit 19 satisfies a predetermined condition. Since the second determination position is present farther in front of the vehicle V than the first determination position, the ratio of an obstacle such as a wall causing a blind spot in the region where the vehicle V can be detected is likely to be lower than the ratio at the first determination position. In other words, the above-described visible region ratio is likely to be higher than the ratio at the first determination position. Accordingly, it is possible to perform control further achieving both discomfort suppression and convenience as compared with the first embodiment in which a determination is made at a first stop position and the driving mode is switched based on the result of the determination.

Figure 8:
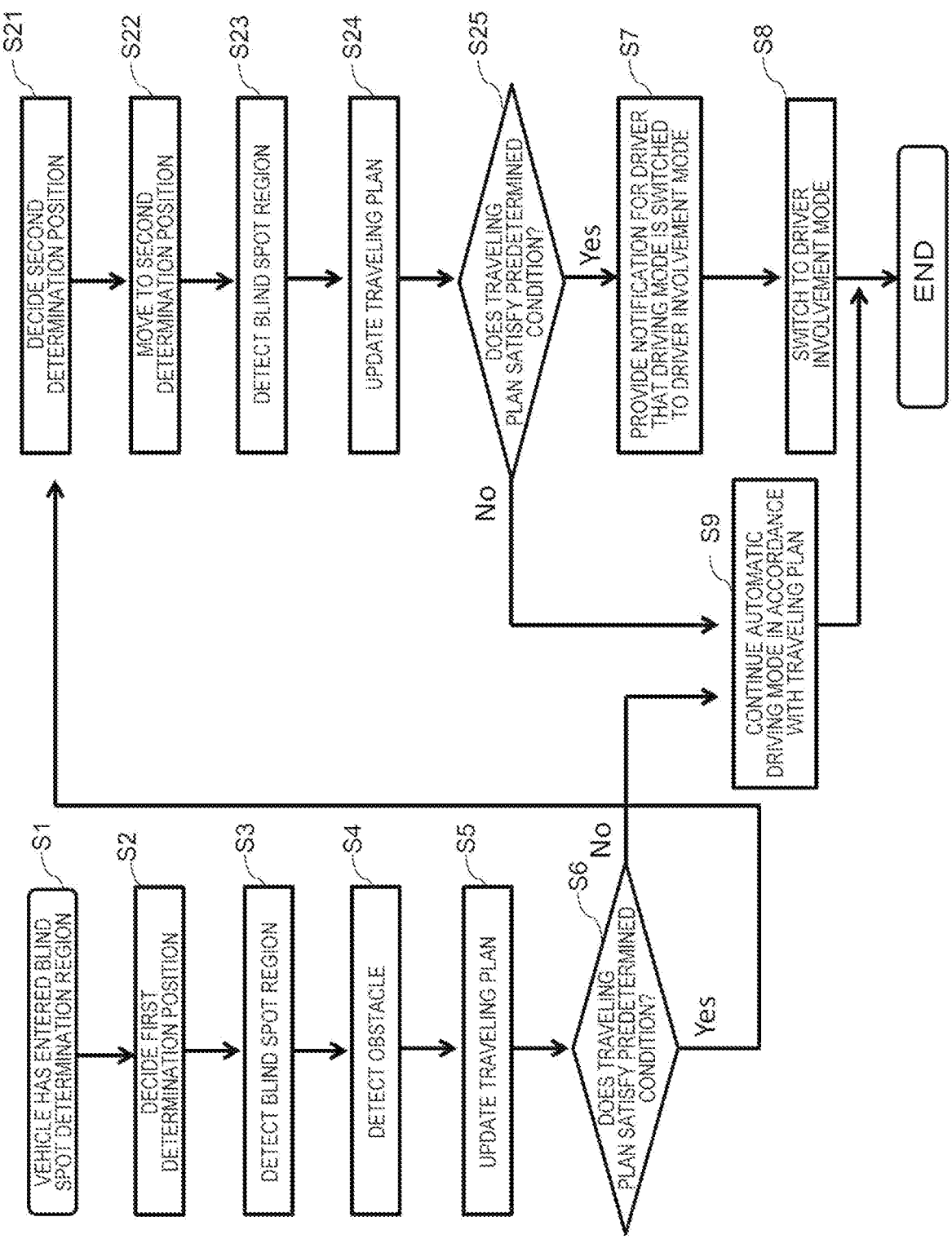
FIG. 8 is a flowchart illustrating the processing that is performed by the vehicle control device according to the second embodiment.

FIG. 8 is a flowchart illustrating the processing executed by the vehicle control device 200 in detail.

The control from S1 to S6 and from S7 to S9 is similar to that of the first embodiment. When the condition determination unit 20 determines in S6 that the traveling plan satisfies a predetermined condition, the processing proceeds to S21. In other words, the processing proceeds to S21 when the condition determination unit 20 determines that the traveling plan is likely to cause the occupant's discomfort.

Subsequently, the second determination position decision unit decides the second determination position (S21). Next, the traveling control unit moves the vehicle to the second determination position (S22) (FIGS. 6 and 7). Although the vehicle speed at this time is not particularly limited, the vehicle speed at this time is preferably a speed (slow speed) at which the vehicle can be immediately stopped when another obstacle (such as a pedestrian) is detected. Next, in S23, the blind spot region specifying unit 17 specifies the blind spot region of the vehicle V at the second determination position based on information related to the distance acquired by the external sensor 1. Next, in S24, the traveling plan update unit 19 assumes that the moving body S1 is present at each position on the boundary specified by the blind spot region specifying unit 17 and updates the traveling plan generated by the traveling plan generation unit 14 based on an assumed behavior of the moving body.

Next, in S25, the condition determination unit 20 determines whether or not the traveling plan updated by the traveling plan update unit 19 satisfies a predetermined condition, that is, whether or not the traveling plan is likely to cause the occupant's discomfort. The subsequent control is similar to that of the first embodiment. When the condition determination unit 20 determines that the traveling plan satisfies the predetermined condition, that is, the traveling plan is likely to cause the occupant's discomfort, the HMI 7 provides a notification for the driver to the effect that the driving mode is switched from the automatic driving mode to the driver involvement mode in a predetermined time (S7). In other words, the HMI 7 provides a notification to the effect that the driver is required to perform a driving operation at least in part in a predetermined time. Next, the switching unit 21 switches the driving mode and the automatic driving mode is switched to the driver involvement mode (S8). When the condition determination unit 20 determines that the traveling plan does not satisfy the predetermined condition, the traveling control unit 15 controls the vehicle in accordance with the updated traveling plan (S9). In other words, when the condition determination unit 20 determines that the traveling plan is unlikely to cause the occupant's discomfort, the switching unit 21 does not switch the driving mode and the automatic driving mode is continued.

As described above, in the vehicle control device 100 of the present embodiment, a movement to the second determination position in front of the first determination position is performed and whether or not the traveling plan satisfies a predetermined condition is determined again when it is determined that the traveling plan generated at the first determination position is likely to cause the occupant's discomfort. In such a configuration, the re-determination is made at the second determination position even when it is determined that the traveling plan does not satisfy a predetermined condition at the first determination position, that is, switching to the driver involvement mode should be performed, and thus a determination can be made in a state where the blind spot region is decreased as compared with the first embodiment. Accordingly, it is possible to suppress unnecessary switching to the driver involvement mode, and thus the occupant's discomfort can be further suppressed. Whether or not the traveling plan satisfies the predetermined condition may be determined at the second determination position without being determined at the first determination position.

Third Embodiment

Next, a third embodiment will be described. In the description of the present embodiment, differences from the first embodiment and the second embodiment will be described. A block diagram illustrating the ECU 10 in the vehicle control device 200 according to the third embodiment is as in FIG. 5.

Figure 9:
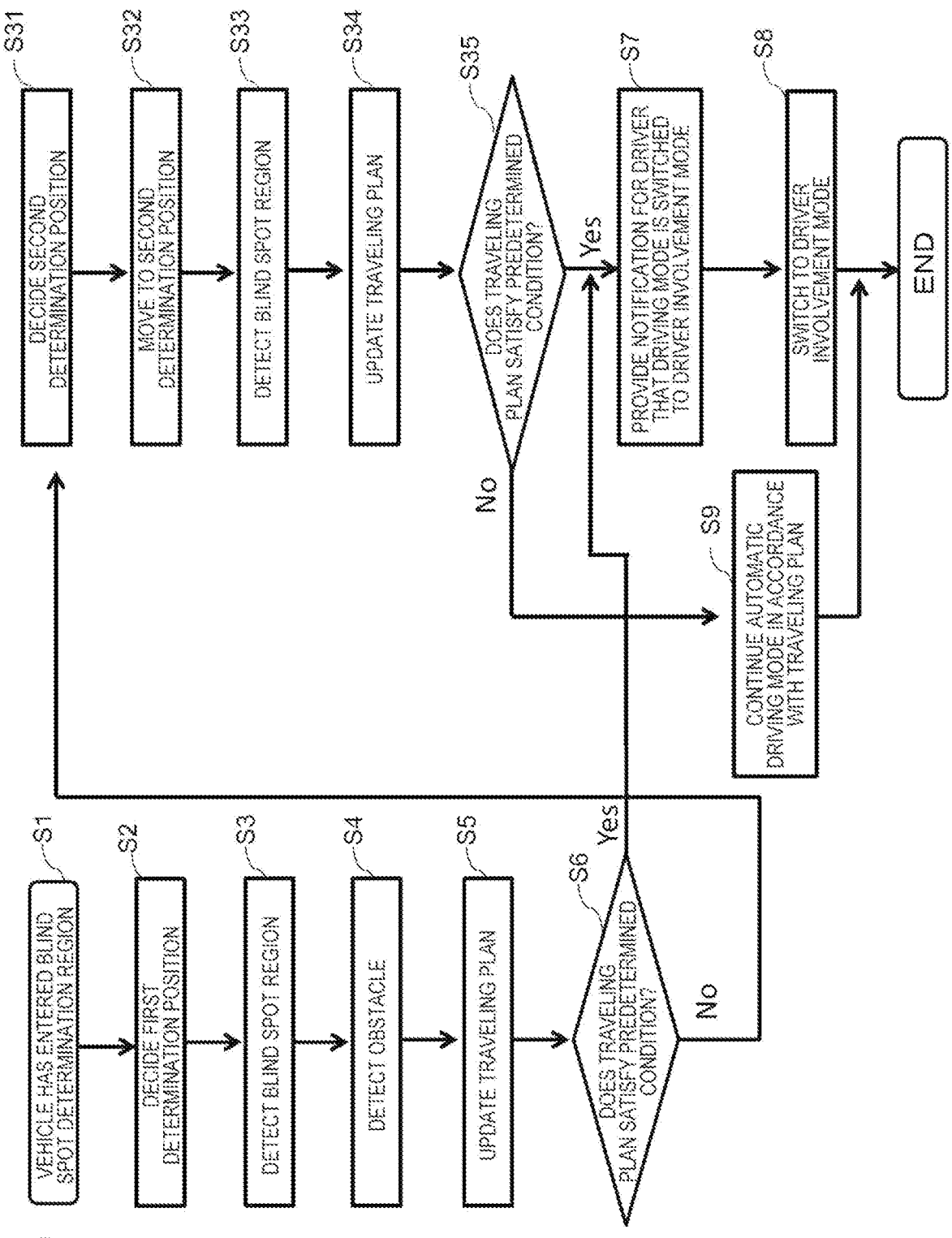
FIG. 9 is a flowchart illustrating the processing that is performed by a vehicle control device according to a third embodiment.

FIG. 9 is a flowchart illustrating the processing executed by the vehicle control device 200 in detail.

The control from S1 to S6 and from S7 to S9 is similar to that of the first embodiment. The control from S31 to S38 is similar to the control from S21 to S28 of the second embodiment. The difference between the third embodiment and the second embodiment is the branching in S6. In S6, the condition determination unit 20 determines whether or not the traveling plan generated by the traveling plan update unit 19 satisfies a predetermined condition. In other words, the condition determination unit 20 determines whether or not the traveling plan generated by the traveling plan update unit 19 causes the occupant's discomfort. When the condition determination unit 20 determines that the traveling plan satisfies the predetermined condition, the HMI 7 provides a notification for the driver to the effect that the driving mode is switched from the automatic driving mode to the driver involvement mode in a predetermined time. In other words, when the condition determination unit 20 determines that the traveling plan causes the occupant's discomfort, the HMI 7 provides a notification for the driver to the effect that the driver is required to perform a driving operation at least in part in a predetermined time (S36). Further, the switching unit 21 switches the driving mode in a predetermined time and the automatic driving mode is switched to the driver involvement mode (S37). The processing proceeds to S31 when the condition determination unit 20 determines that the traveling plan does not satisfy the predetermined condition, that is, the traveling plan does not cause the occupant's discomfort.

As described above, in the vehicle control device 200 of the present embodiment, a movement to the second determination position in front of the first determination position is performed and whether or not the traveling plan satisfies a predetermined condition is determined again when it is determined that the traveling plan generated at the first determination position causes no discomfort. In such a configuration, the re-determination is made after the forward movement to the second determination position for safer traveling even when it is determined that the traveling plan does not satisfy the predetermined condition at the first determination position, that is, the automatic driving mode can be continued. Accordingly, safety can be further improved as compared with the first embodiment.

Fourth Embodiment

Next, a fourth embodiment will be described. In the description of the present embodiment, differences from the first embodiment will be described.

Figure 10:
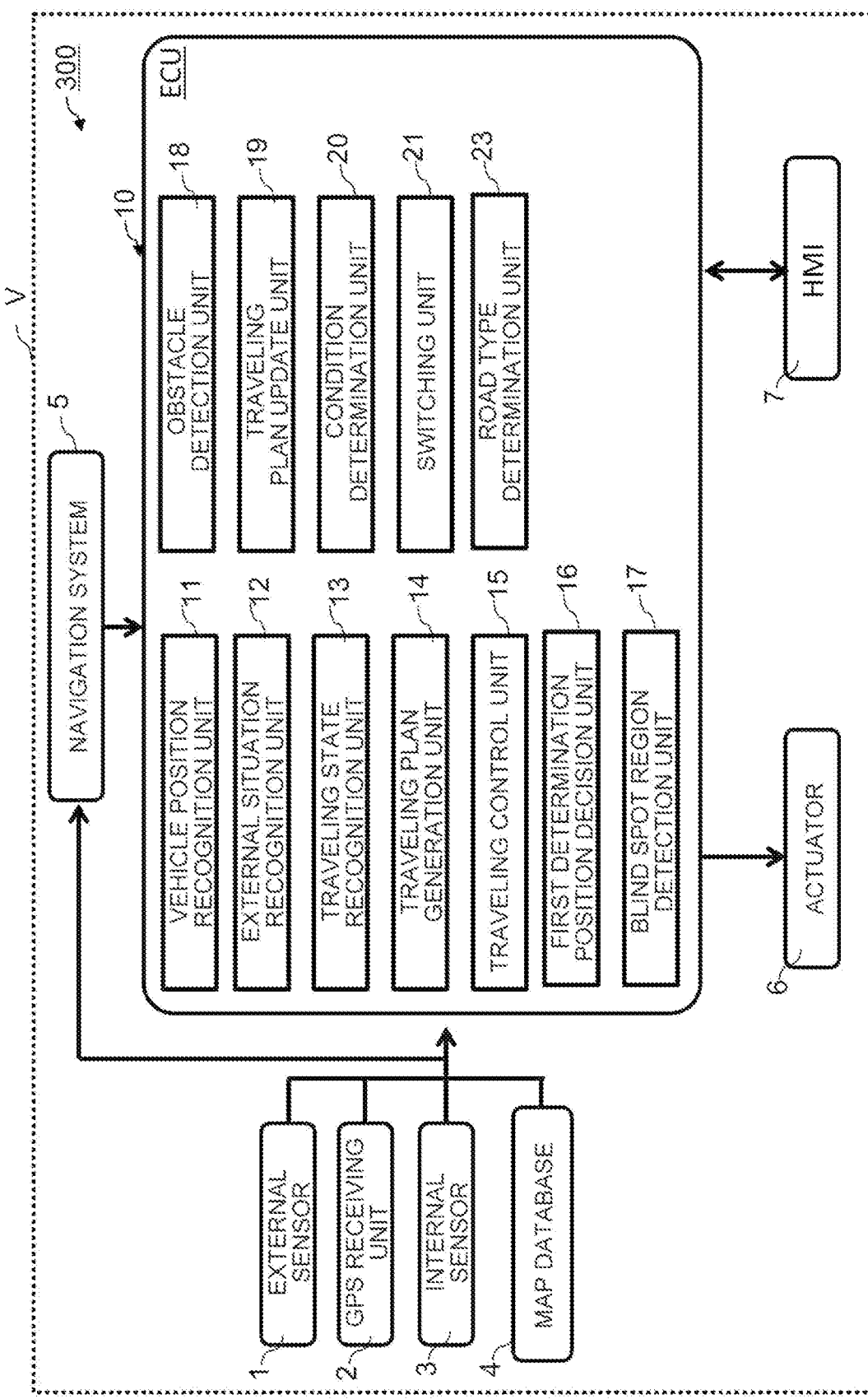
FIG. 10 is a block diagram illustrating an ECU of a vehicle control device according to a fourth embodiment.

FIG. 10 is a block diagram illustrating the ECU 10 in a vehicle control device 300 according to the fourth embodiment. As illustrated in FIG. 10, the vehicle control device 300 of the present embodiment is different from the first embodiment in that the ECU 10 has a road type determination unit 23. The road type determination unit 23 determines whether or not the traveling lane of the host vehicle is a priority road based on the map database 4. Regarding the priority road determination, a known method such as Japanese Unexamined Patent Publication No. 2016-122308 can be adopted.

Figure 11:
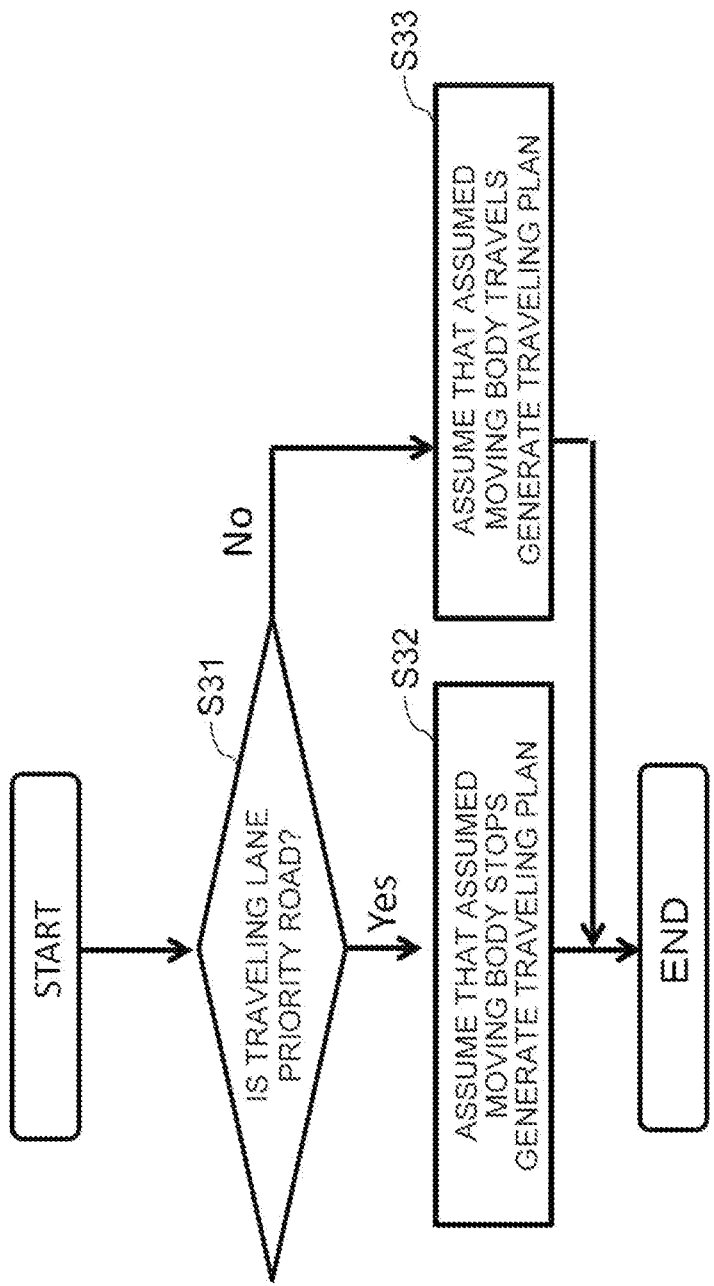
FIG. 11 is a flowchart illustrating the processing that is performed by the vehicle control device according to the fourth embodiment.

FIG. 11 is a flowchart illustrating the processing executed by the vehicle control device 300 in detail.

In this embodiment, S31 to S33 are provided in place of S5 in the first embodiment. First, the road type determination unit 23 determines whether or not the traveling lane of the host vehicle is a priority road (S31). When the road type determination unit 23 determines that the traveling lane of the host vehicle is a priority road, the traveling plan update unit 19 assumes that the moving body assumed to be present on the blind spot boundary temporarily stops before entering the intersection and generates a traveling plan to avoid a collision with the moving body (S32). When the road type determination unit 23 determines that the traveling lane of the host vehicle is not a priority road, the traveling plan update unit 19 assumes that the moving body assumed to be present on the blind spot boundary travels and generates a traveling plan to avoid a collision with the moving body (S33).

As described above, in the vehicle control device 300 according to the present embodiment, it is possible to make a determination in accordance with whether or not the traveling road of the host vehicle is a priority road, and thus it is possible to suppress unnecessary switching to the driver involvement mode. Accordingly, convenience can be improved and the occupant's discomfort can be suppressed at the same time. The present embodiment may be applied to the second embodiment and the third embodiment. In other words, the vehicle control device 300 may further include the second determination position decision unit 22.

Fifth Embodiment

Next, a fifth embodiment will be described. In the description of the present embodiment, differences from the first embodiment will be described.

Figure 12:
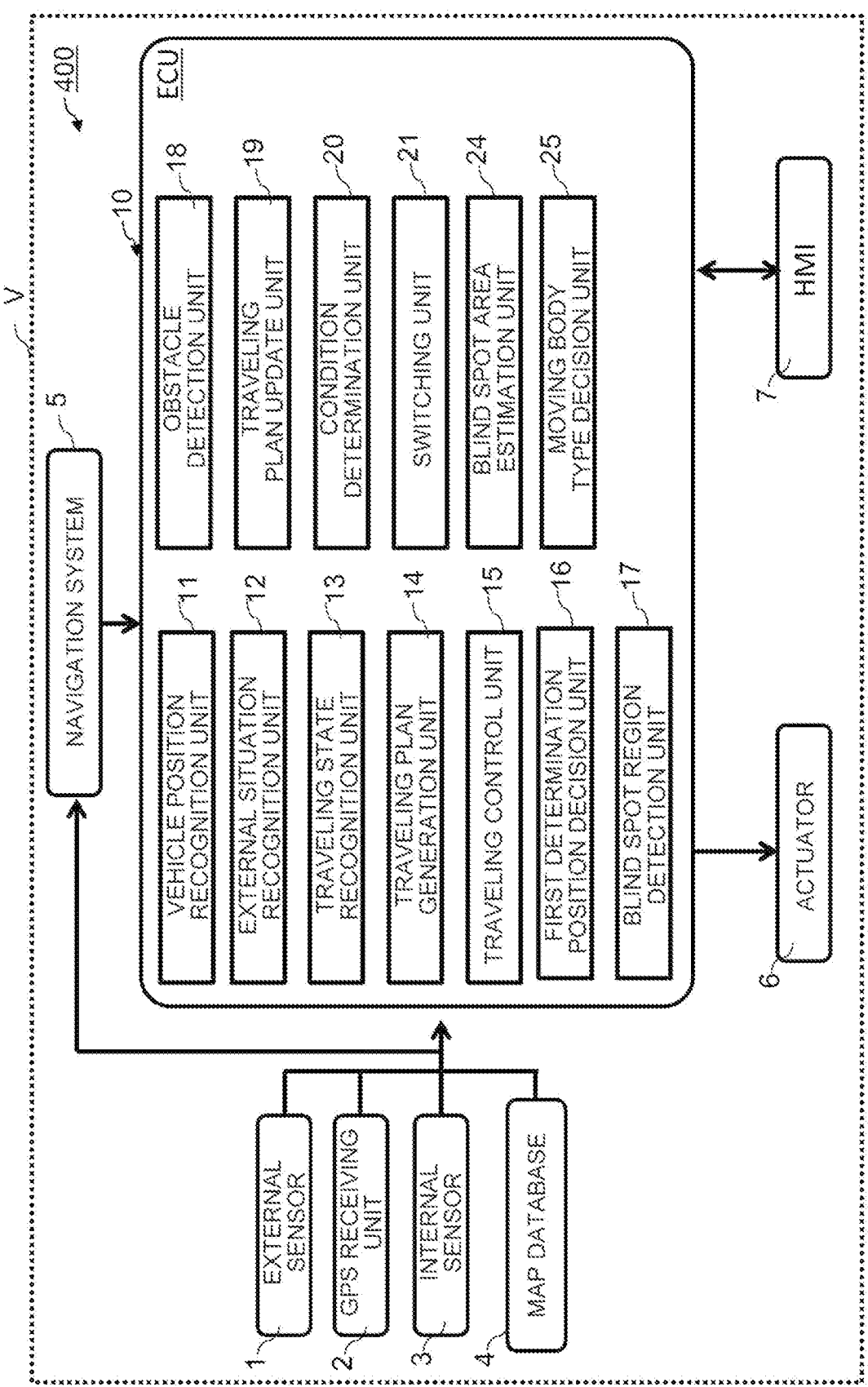
FIG. 12 is a block diagram illustrating an ECU of a vehicle control device according to a fifth embodiment.

FIG. 12 is a block diagram illustrating the ECU 10 in a vehicle control device 500 according to the fifth embodiment. As illustrated in FIG. 12, the vehicle control device 400 of the present embodiment is different from the first embodiment in that a blind spot area estimation unit 24 and a moving body type decision unit 25 are further provided.

Figure 13:
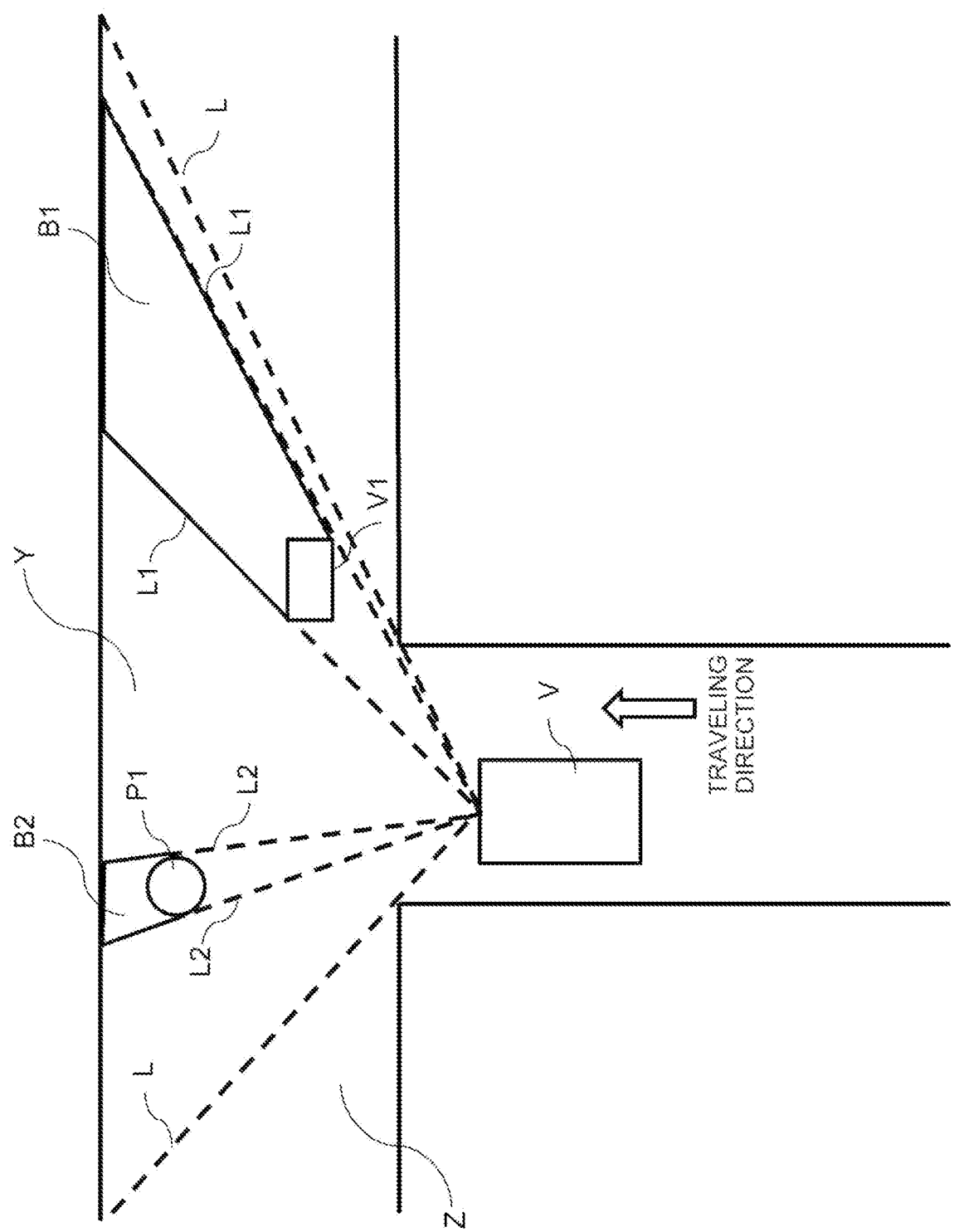
FIG. 13 is a diagram illustrating an aspect in which a blind spot area is estimated.

An aspect in which the blind spot area estimation unit 24 estimates a blind spot area is schematically illustrated in FIG. 13. In FIG. 13, a vehicle V1 stops and a pole P1 is present in the visible region Y for the host vehicle V. The blind spot region specifying unit 17 specifies each of a blind spot region B1 generated by the vehicle V1 and formed by a blind spot boundary L1 and a blind spot region B2 generated by the pole P1 and formed by a blind spot boundary L2. The blind spot area estimation unit 24 calculates a two-dimensional blind spot area by using the road information included in the map database 4. Specifically, the areas of the blind spot regions B1 and B2 in the ranges of a roadway and a sidewalk are the blind spot areas of the blind spot regions B1 and B2, respectively.

The moving body type decision unit 25 decides the type of the moving body assumed by the traveling plan update unit 19 to jump out of the blind spot based on the blind spot area estimated by the blind spot area estimation unit 24. Specifically, the moving body type decision unit 25 decides whether the assumed moving body is at least one of a pedestrian and a vehicle. For instance, the moving body assumed to jump out of the blind spot is a vehicle when the blind spot area is larger than a predetermined threshold and the moving body assumed to jump out of the blind spot is a pedestrian when the blind spot area is smaller than the predetermined threshold. However, the present disclosure is not limited to the above and the moving body assumed to jump out of the blind spot can be a pedestrian, in view of at least one of a detection result such as a crosswalk being present near the blind spot and the information included in the map database 4, even when the blind spot area is larger than the predetermined threshold. In addition, the moving body assumed to jump out of the blind spot can be a vehicle, in view of at least one of a detection result such as a parking lot being present near the blind spot and the information included in the map database 4, even when the blind spot area is smaller than the predetermined threshold.

Figure 14:
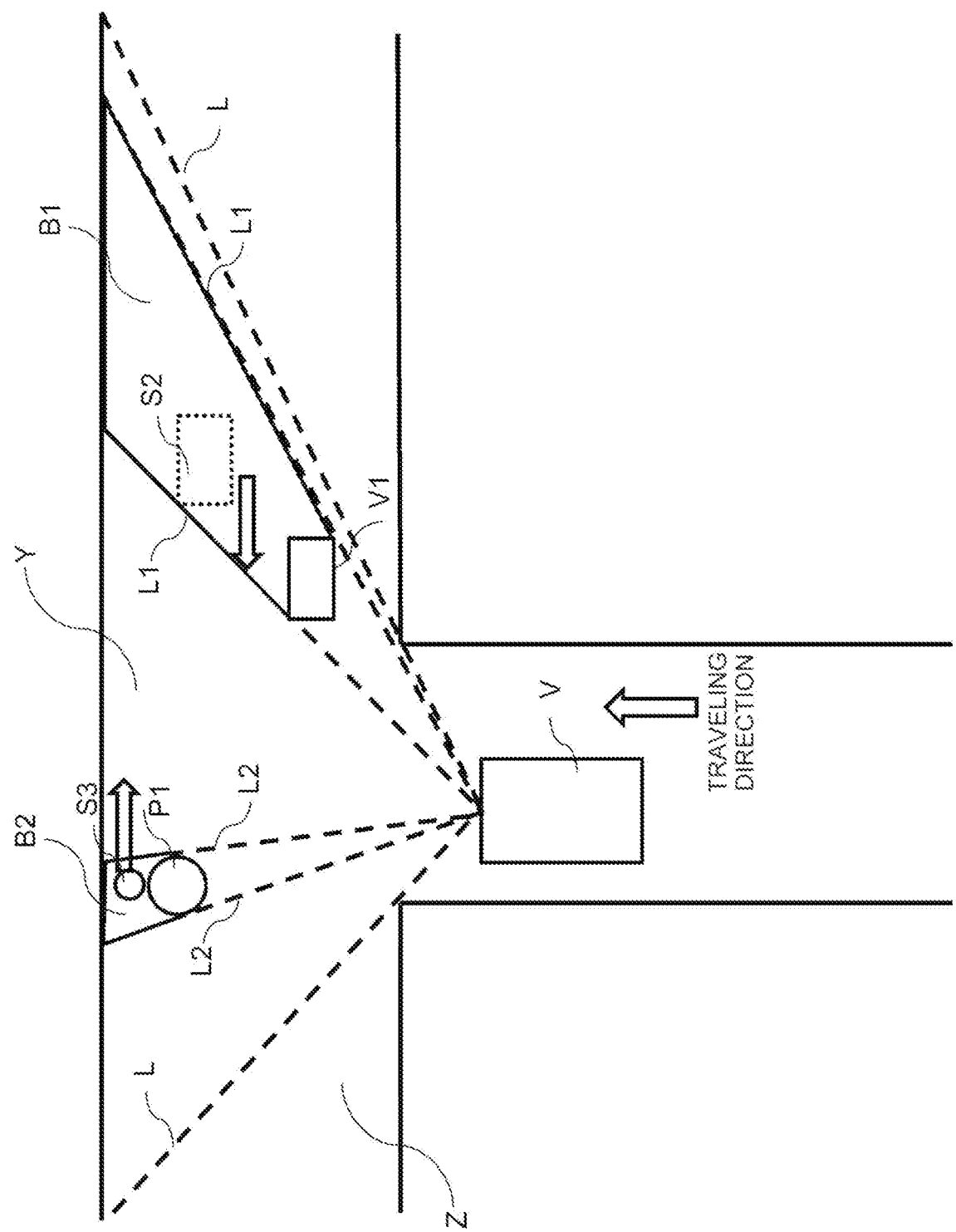
FIG. 14 is a diagram illustrating the state of a moving body assumed in the estimated blind spot area.

For instance, in FIG. 14, the moving body type decision unit 25 determines that the blind spot area of the blind spot region B1 is larger than a predetermined threshold and decides that a vehicle is the moving body assumed to be present at the blind spot boundary L1 forming the blind spot region B1. At this time, the traveling plan update unit 19 assumes that the vehicle S2 is present at the blind spot boundary L1 as a moving body moving at a predetermined speed and generates and updates a traveling plan to avoid a collision with the vehicle S2. The moving body type decision unit 25 determines that the blind spot area of the blind spot region B2 is smaller than a predetermined threshold and decides that a pedestrian is the moving body assumed to be present at the blind spot boundary L2 forming the blind spot region B2. The traveling plan update unit 19 assumes that a pedestrian S3 is present at the blind spot boundary L2 as a moving body moving at a predetermined speed and generates and updates a traveling plan to avoid a collision with the pedestrian S3.

Figure 15:
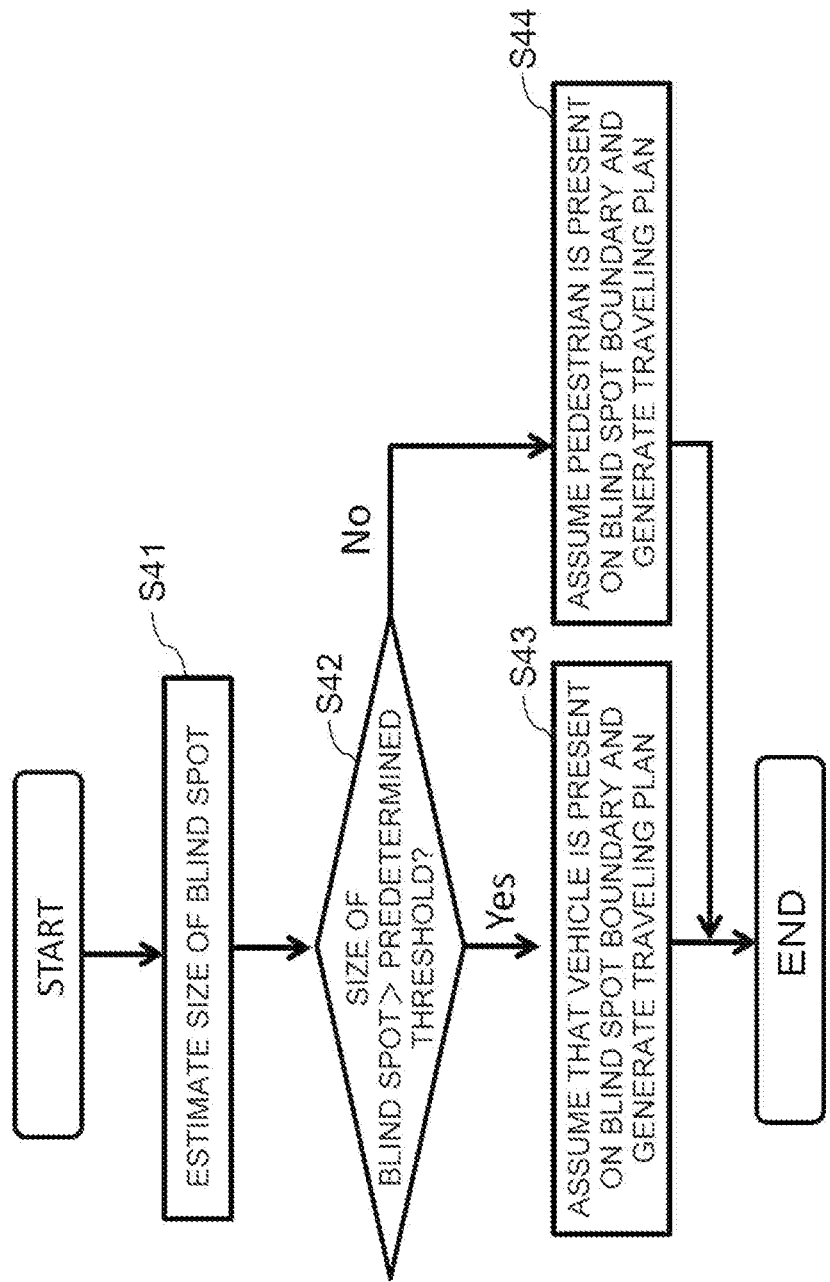
FIG. 15 is a flowchart illustrating the processing that is performed by the vehicle control device according to the fifth embodiment.

FIG. 15 is a flowchart illustrating the processing executed by the vehicle control device 400 in detail. In the first embodiment, the traveling plan generation unit 14 in S5 assumes that a moving body assumed to be present on the blind spot boundary travels and generates a traveling plan to avoid a collision with the moving body.

In the fifth embodiment, S41 to S44 are provided in place of S5. In S41, the blind spot area estimation unit 24 estimates the area of the blind spot specified by the blind spot region specifying unit 17. Next, the moving body type decision unit 25 decides whether the moving body assumed by the traveling plan update unit 19 is at least one of a pedestrian and a vehicle based on the blind spot area estimated by the blind spot area estimation unit 24 (S42). When it is decided that the moving body is a vehicle, the traveling plan update unit 19 assumes that a vehicle is present on the blind spot boundary and generates a traveling plan to avoid a collision with the vehicle (S43). When it is determined that the moving body is a pedestrian, the traveling plan update unit 19 assumes that a pedestrian is present on the blind spot boundary and generates a traveling plan to avoid a collision with the pedestrian (S44).

As described above, in the vehicle control device 400 according to the present embodiment, the assumed moving body can be changed based on the calculated blind spot area, and thus it is possible to more appropriately determine whether to switch to the driver involvement mode and it is possible to suppress unnecessary switching to the driver involvement mode. Accordingly, convenience can be improved and the occupant's discomfort can be suppressed at the same time.

The present embodiment may be applied to the second embodiment. In other words, the vehicle control device 400 may further include the second determination position decision unit 22. Instead thereof or in addition thereto, the present embodiment may be applied to the third embodiment. In other words, the vehicle control device 400 may further include the road type determination unit 23.

Although embodiments of the present disclosure have been described above, the present disclosure is implemented in various forms without being limited to the embodiments.

In the above embodiments, the vehicle V does not necessarily have to remain strictly stopped at the first determination position and the second determination position (with the speed strictly at zero) and the vehicle V may be driven with a minute drive force that does not significantly affect the motion state of the vehicle V.

In each embodiment, the HMI 7 may provide a notification for the driver to the effect that the entire driving operation is entrusted to the driver or provide a notification for the driver to the effect that the driving operation is entrusted in part (such as the effect that a foot is put on the brake pedal). These may be selected in advance by at least one of the driver and the occupant before driving initiation or may be variably set in accordance with the disparity between the predetermined condition and the traveling plan determined by the condition determination unit. Specifically, a notification to the effect that the driving operation is entrusted in part may be provided when the disparity between the predetermined condition and the traveling plan is small and a notification to the effect that the entire driving operation is entrusted may be provided when the disparity between the predetermined condition and the traveling plan is large.

In each embodiment, the blind spot region specifying unit 17 may use a structure installed on the premise of human use, such as a curve mirror, as the detection result of the external sensor 1. A known technique (such as Japanese Unexamined Patent Publication No. 2017-162178) can be used regarding the curve mirror-based recognition and blind spot specification by the external sensor 1.

In the above embodiments, some of the functions of the ECU 10 may be executed by a computer in a facility such as an information processing center capable of communicating with the vehicle V.

What is claimed is:

1. A vehicle control device configured to control a vehicle capable of switching between an automatic driving mode and a driver involvement mode in which a driver is involved, the vehicle control device comprising:
   a blind spot boundary specifying unit configured to specify a boundary of a region becoming a blind spot of the vehicle;
   a traveling plan generation unit configured to generate a traveling plan in which the vehicle does not collide with a moving body assumed to be positioned on a blind spot boundary specified by the blind spot boundary specifying unit;
   a determination unit configured to determine whether or not the traveling plan generated by the traveling plan generation unit satisfies a predetermined condition;
   a switching unit configured to switch the vehicle from the automatic driving mode to the driver involvement mode when the determination unit determines that the traveling plan satisfies the predetermined condition;
   a map database; and
   a road type determination unit configured to determine, based on the map database, whether or not a lane in which the vehicle travels is a priority road with respect to a lane in which the assumed moving body travels;
   wherein the lane in which the assumed moving body travels crosses the lane in which the vehicle travels, and
   wherein the traveling plan generation unit is configured to generate the traveling plan on an assumption that the assumed moving body is stopping when the road type determination unit determines that the lane in which the vehicle travels is the priority road, and generate the traveling plan on an assumption that the assumed moving body is traveling when the road type determination unit determines that the lane in which the vehicle travels is not the priority road.

2. The vehicle control device according to claim 1, wherein the predetermined condition is that at least one of a speed, an acceleration, and a yaw rate in the traveling plan generated by the traveling plan generation unit is equal to or greater than a predetermined threshold.

3. The vehicle control device according to claim 2, further comprising a notification unit configured to notify the driver that the vehicle is switched from the automatic driving mode to the driver involvement mode before the switching unit switches the vehicle from the automatic driving mode to the driver involvement mode when the determination unit determines that the traveling plan satisfies the predetermined condition.

4. The vehicle control device according to claim 2, wherein
   a determination position where the determination unit makes a determination includes a first determination position and a second determination position positioned farther in front of the vehicle than the first determination position, and
   the determination unit is configured to determine whether or not the traveling plan satisfies the predetermined condition at the second determination position after determining whether or not the traveling plan satisfies the predetermined condition at the first determination position.

5. The vehicle control device according to claim 2, wherein the traveling plan generation unit is configured to estimate a blind spot area from the map database and the blind spot boundary specified by the blind spot boundary specifying unit and decide the type of the assumed moving body based on the blind spot area.

6. The vehicle control device according to claim 1, further comprising a notification unit configured to notify the driver that the vehicle is switched from the automatic driving mode to the driver involvement mode before the switching unit switches the vehicle from the automatic driving mode to the driver involvement mode when the determination unit determines that the traveling plan satisfies the predetermined condition.

7. The vehicle control device according to claim 6, wherein
   a determination position where the determination unit makes a determination includes a first determination position and a second determination position positioned farther in front of the vehicle than the first determination position, and the determination unit is configured to determine whether or not the traveling plan satisfies the predetermined condition at the second determination position after determining whether or not the traveling plan satisfies the predetermined condition at the first determination position.

8. The vehicle control device according to claim 6, wherein the traveling plan generation unit is configured to estimate a blind spot area from the map database and the blind spot boundary specified by the blind spot boundary specifying unit and decide the type of the assumed moving body based on the blind spot area.

9. The vehicle control device according to claim 1, wherein
a determination position where the determination unit makes a determination includes a first determination position and a second determination position positioned farther in front of the vehicle than the first determination position, and
the determination unit is configured to determine whether or not the traveling plan satisfies the predetermined condition at the second determination position after determining whether or not the traveling plan satisfies the predetermined condition at the first determination position.

10. The vehicle control device according to claim 9, wherein the traveling plan generation unit is configured to estimate a blind spot area from the map database and the blind spot boundary specified by the blind spot boundary specifying unit and decide the type of the assumed moving body based on the blind spot area.

11. The vehicle control device according to claim 1, wherein the traveling plan generation unit is configured to estimate a blind spot area from the map database and the blind spot boundary specified by the blind spot boundary specifying unit and decide the type of the assumed moving body based on the blind spot area.

12. The vehicle control device according to claim 1, wherein a determination position where the determination unit makes the determination of whether or not the traveling plan generated by the traveling plan generation unit satisfies the predetermined condition is a position where a visible region ratio is below a predetermined ratio during the traveling of the vehicle.

* * * * *